US007782017B2

(12) United States Patent
Hack et al.

(10) Patent No.: US 7,782,017 B2
(45) Date of Patent: Aug. 24, 2010

(54) APPARATUS AND METHOD FOR PRODUCING SIGNAL CONVEYING CIRCUIT STATUS INFORMATION

(75) Inventors: Thomas P. Hack, Bedford, NH (US); Robert C. Dobkin, Monte Sereno, CA (US); Alfonso Centuori, Malden, MA (US); Andrew Bishop, Essex, VT (US)

(73) Assignee: Linear Technology Corporation, Milpitas, CA (US)

( * ) Notice: Subject to any disclaimer, the term of this patent is extended or adjusted under 35 U.S.C. 154(b) by 488 days.

(21) Appl. No.: 11/582,443

(22) Filed: Oct. 18, 2006

(65) Prior Publication Data

US 2007/0216380 A1 Sep. 20, 2007

Related U.S. Application Data

(60) Provisional application No. 60/777,121, filed on Feb. 28, 2006.

(51) Int. Cl.
*H02J 7/00* (2006.01)
*H02J 7/04* (2006.01)
*H02J 7/16* (2006.01)
*G01N 27/42* (2006.01)

(52) U.S. Cl. ........................ 320/132; 320/134; 320/136; 320/150; 320/152; 324/425

(58) Field of Classification Search ................. 320/132, 320/148, 149; 324/500, 520, 522, 523, 527, 324/532, 537, 771, 426–434, 436
See application file for complete search history.

(56) References Cited

U.S. PATENT DOCUMENTS

| | | | | |
|---|---|---|---|---|
| 5,629,605 | A * | 5/1997 | Lavan et al. | 340/636.1 |
| 5,666,040 | A * | 9/1997 | Bourbeau | 320/118 |
| 5,872,512 | A * | 2/1999 | Kackman et al. | 340/507 |
| 6,574,482 | B1 * | 6/2003 | Radomsky et al. | 455/517 |
| 2004/0078155 | A1 * | 4/2004 | Thibedeau et al. | 702/63 |
| 2004/0257042 | A1 * | 12/2004 | Liu et al. | 320/130 |
| 2005/0109111 | A1 * | 5/2005 | Manlove et al. | 73/583 |
| 2005/0116697 | A1 * | 6/2005 | Matsuo et al. | 323/282 |

OTHER PUBLICATIONS

"Standalone Linear Li-Ion Battery Charger with Thermistor Input," Linear Technology, 2004, p. 1-20, LTC4061, Linear Technology Corporation, USA.
Chinese Office Action, with English translation, issued in Chinese Patent Application No. 2007100049855, dated Jul. 24, 2009.

* cited by examiner

*Primary Examiner*—Edward Tso
*Assistant Examiner*—Ahmed Omar
(74) *Attorney, Agent, or Firm*—McDermott Will & Emery LLP

(57) ABSTRACT

Apparatus is configured for producing an output signal indicating an operating status of a monitored circuit. An input signal relating to the monitored circuit is received at an input node. A pulse train generator, coupled to the input node, is configured for generating a pulse train of a prescribed repetition rate at a duty cycle alternated between first and second duty cycle values at a prescribed frequency. The duty cycle and frequency are indicative of operating status of the monitored circuit.

47 Claims, 28 Drawing Sheets

APPARATUS AND METHOD FOR PRODUCING SIGNAL CONVEYING CIRCUIT STATUS INFORMATION

CLAIM OF PRIORITY

This patent application, and any patent(s) issuing therefrom, claims priority to U.S. provisional patent application No. 60/777,121, filed on Feb. 28, 2006, which is incorporated herein by reference in its entirety.

TECHNICAL FIELD

This disclosure relates generally to methodology and circuitry for generating a signal conveying information on a condition of a circuit or system, such as a battery charger, and more particularly to doing so in such a manner as to be discernible to both a processor and a user.

BACKGROUND

Light emitting diodes or other sources of light or reflection provide low cost visual status indication in electronic systems. A single LED, for example, can indicate several states simply by being on, off, or by blinking on and off with various combinations of duty factors, pulse patterns, or frequencies. Output voltage and current may also be used to provide status to other electronic devices, but have limited use in visual indication. A common application of status indicators is in battery chargers where an end user needs to know when a battery is charging, fully charged, defective, or has encountered an error condition during charging such as battery under- or over-temperature.

A common problem with existing techniques is that an LED must present information at a rate slow enough for human interpretation. This usually restricts the blink frequency to 10 Hz or less depending on the complexity of the blink pattern, etc. In addition, coding by frequency usually requires separation of at least an octave between various blink frequencies in order to insure correct identification of status.

FIG. 1 illustrates typical status signals, in which region A shows state 1 indicated by a logic low of long duration, region B shows state 2 indicated by a low frequency pulse with a 50% duty cycle, region C illustrates state 3 indicated by a low frequency pulse with a 25% duty cycle, region D shows state 4 indicated by a high frequency square wave, and region E illustrates state 5 indicated by a logic high of long duration. The waveforms represent only a few of the many combinations of pulse trains that may be used for visual status indication through LEDs. A blink rate of 1-2 Hertz may be required in states 2 and 3 in order to make the frequency difference between these states and state 4 sufficiently different to allow ready visual interpretation. State 4 should not blink much faster than 10 Hertz because state 4 may be confused with state 5. At frequencies much above 10 Hertz, human eyes interpret a pulsed light source as a continuously-on light source.

With these restrictions, it becomes clear that a status pin of the battery charger that is designed for visual status indication is a poor interface for microprocessors, microcontrollers or other digital devices. In order to determine status, a microprocessor must observe the status pin for one or more cycles of the lowest frequency pulse train. This is required in order to prevent misinterpreting a change, for example, from state 1 to state 5, as a state 2 event. Many other misinterpreted state combinations are possible if a sufficiently long time is not used to read the status. Even in the best implementation, where a status line from the status pin provides a hardware interrupt to a microprocessor when an edge occurs on the status line, or intelligent edge sampling techniques are used, the microprocessor may need to wait an excessive amount of time to determine status. The subject matter described herein addresses the above shortcomings.

SUMMARY OF DISCLOSURE

Embodiments detailed herein describe an apparatus for producing an output signal indicating an operating status of a monitored circuit, a battery charger, and a method for producing status information relating to a monitored circuit. In one aspect, the apparatus may comprise an input node for receiving an input signal relating to the monitored circuit. The apparatus may also includes a pulse train generator coupled to the input node and configured for generating a pulse train of a prescribed repetition rate at a duty cycle alternated between first and second duty cycle values at a prescribed frequency. The duty cycle and frequency are indicative of operating status of the monitored circuit. An output node to which the pulse train is applied can be provided to the apparatus.

In another aspect, a battery charger may include a detector detecting an operating status of a battery. The battery may also have a pulse train generator coupled to the detector and configured for generating a pulse train of a prescribed repetition rate at a duty cycle alternated between first and second duty cycle values at a prescribed frequency. The duty cycle and frequency are indicative of operating status of the battery. The battery can include an output node to which the pulse train is applied.

In still another aspect, a method for producing status information relating to a monitored circuit may comprise receiving an input signal relating to the monitored circuit. A pulse train of a prescribed repetition rate may be generated at a duty cycle alternated between first and second duty cycle values at a prescribed frequency based on the input signal. The duty cycle and frequency are indicative of operating status of the monitored circuit.

Additional aspect and advantages of the present disclosure will become readily apparent to those skilled in the art from the following detailed description, wherein only exemplary embodiments of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

Examples of the subject matter claimed herein are illustrated in the figures of the accompanying drawings and in which reference numerals refer to similar elements and in which:

FIGS. 22-25 are exemplary simulated waveforms generated in the circuit shown in FIG. 21, in which FIG. 22 shows a simulation with data bit B0=L and data bit B1=L, FIG. 23 shows a simulation with data bit B0=H and data bit B1=L, FIG. 24 shows a simulation with data bit B0=L and data bit B1=H, and FIG. 25 shows a simulation with data bit B0=H and data bit B1=H.

As will be realized, the present disclosure is capable of other and different embodiments, and its several details are capable of modification in various obvious respects, all without departing from the disclosure. Accordingly, the drawings and description are to be regarded as illustrative in nature, and not as restrictive.

DETAILED DESCRIPTION

Figure 2:
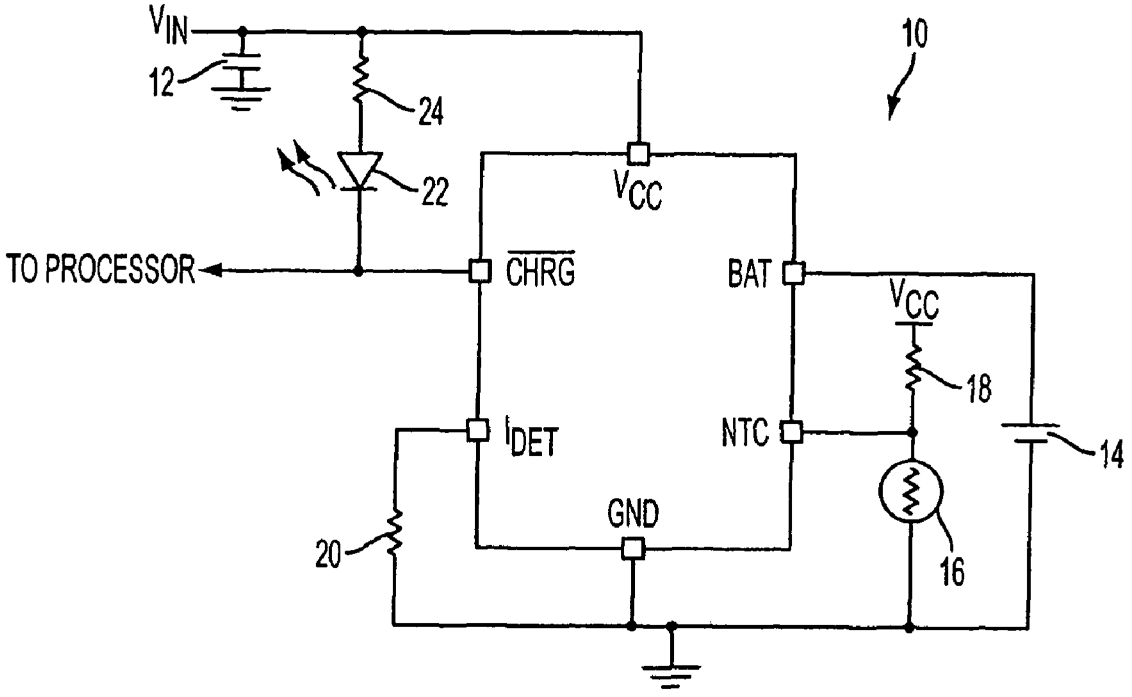
FIG. 2 is an exemplary diagram illustrating a battery charger according to one embodiment of the disclosure.

FIG. 2 is an exemplary diagram illustrating a battery charger implementing the inventive subject matter described herein. Battery charger 10 includes pin Vcc, bypassed with capacitor 12, to receive positive input supply voltage $V_{IN}$ (e.g., 5 V). This pin provides power to battery charger 10. Pin BAT is a charge current output node, to which battery 14 is connected. Pin NTC is an input to an NTC (Negative Temperature Coefficient) thermistor temperature monitoring circuit. Under normal operation, thermistor 16 is connected from pin NTC to ground and resistor 18 of value to the nominal value of the thermistor from pin NTC to input supply voltage $V_{IN}$. For example, when the voltage at pin NTC drops below $0.35 \cdot V_{IN}$ at hot temperatures or increases above $0.75 \cdot V_{IN}$ at cold ("NTC fault"), charging battery 14 is suspended. Pin $I_{DET}$ is a current detection threshold program pin. Resistor 20 coupled to pin $I_{DET}$ sets threshold current level $I_{DETECT}$. Battery charger 10 monitors whether the charge current is greater than level $I_{DETECT}$. When the charge current is greater than level $I_{DETECT}$, it is indicated that battery 14 is being charged. Battery charger 10 also includes pin GND coupling internal circuitry of battery charger 10 to ground. Battery charger may further be configured to detect whether battery 14 is detective or not.

A /CHRG pin is an open-drain charge status output. An NMOS transistor (see transistor ESD7 in FIG. 14) is coupled to pull down the /CHRG pin. A microprocessor, microcontroller or other electronics and LED 22 may be coupled to this /CHRG pin, as shown in FIG. 2. LED 22 is coupled to input supply voltage $V_{IN}$ through resistor 24. In this embodiment, the /CHRG pin can indicate alternatively that battery 14 is charging, not charging, battery temperature out of range (NTC fault) and a battery defective, but not limited to those states.

Figure 1:
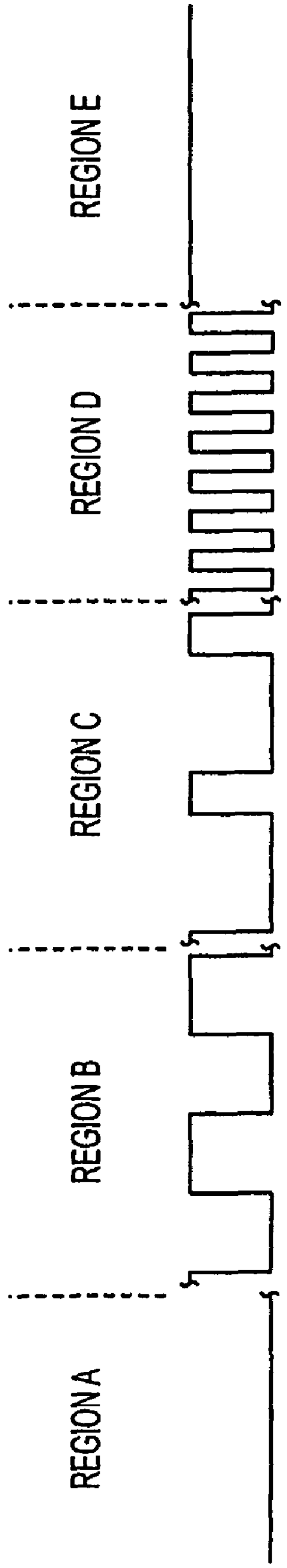
FIG. 1 shows examples of status signals that may be produced by an LED, or the like, to provide information.

For example, when battery charger 10 is charging battery 14 and the charge current is greater than level $I_{DETECT}$ set by resistor 20, the NMOS transistor continuously pulls down current, and thus, LED 22 shows a logic high state (see FIG. 1, region E). On the other hand, when the charge current drops below level $I_{DETECT}$ (not charging), an NMOS transistor is in a high impedance state, and thus, LED 22 shows a logic low state (see FIG. 1, region A). Further, when the NTC fault or the battery defective occurs, a pulse train shown in FIG. 3 is provided from the /CHRG pin to the processor and LED 22.

Figure 3:
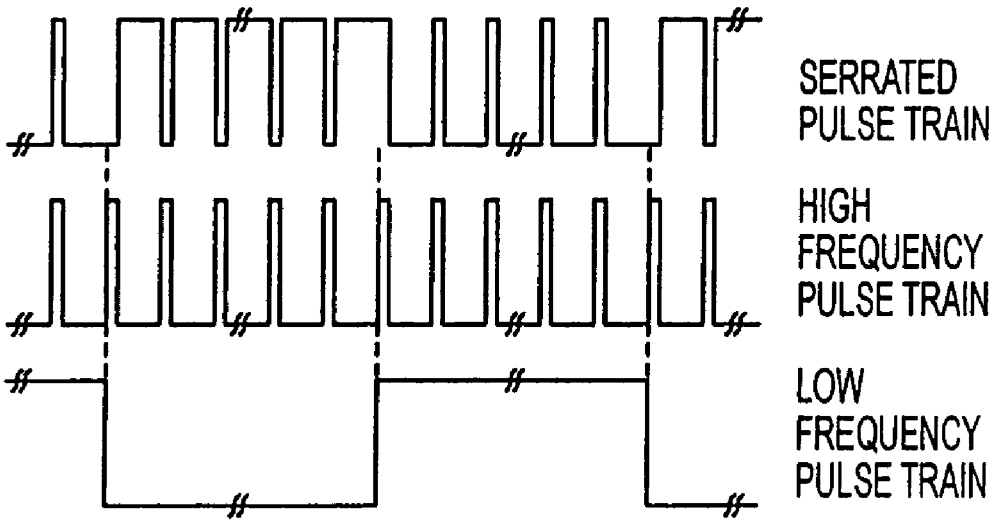
FIG. 3 is an example of waveforms of low and high frequency pulse trains and a serrated pulse train according to one embodiment of the disclosure.

The pulse train of FIG. 3 carries status of battery 14 (e.g., NTC fault or battery detective) at a rate slow enough for visual status indication through LED 22, while providing status at a high rate to the microprocessor in accord with a feature of this disclosure. The pulse train includes additional edges at a higher frequency to an original low frequency pulse train in the form of serrations ("serrated pulse train"). In the serrated pulse train, the duty cycle may be alternated between a higher duty factor and a lower duty factor according to the frequency ("alternating frequency" or "blink frequency" in this disclosure) of the low frequency pulse train. The duty cycle information conveys status to a microprocessor, while the blink frequency information conveys the status to LED 22 for visual status indication. LED 22 blinks according to the blink frequency. Varying the duty cycle and the blink frequency can convey different statuses to the microprocessor and LED 22. FIG. 3 shows high and low frequency pulse trains with an integer frequency ratio in order to simplify the diagram. It is noted that the ratio of the high frequency pulse train and the low frequency pulse train is adjusted for the illustration purpose.

As mentioned above, duty cycle information is used to communicate with the microprocessor, while frequency information will be used to communicate with humans. In the serrated pulse train of FIG. 3, the serrations occur at a frequency much higher than the critical flicker frequency of human eyes. The serrations, thus, do not affect visual status indication of LED 22. On the other hand, an LED appears to alternate between bright and dim states at the low frequency pulse repetition frequency (blink frequency). For example, the duty factor should be as low as possible during the dim state of the LED, while still allowing simple interpretation by the microprocessor. Experimental results show that about 10% or less duty cycles (dim state) may be needed to make the LED appear nearly off. To make the LED appear nearly on, about 90% or greater duty cycles (bright state) may be required.

Figure 4:
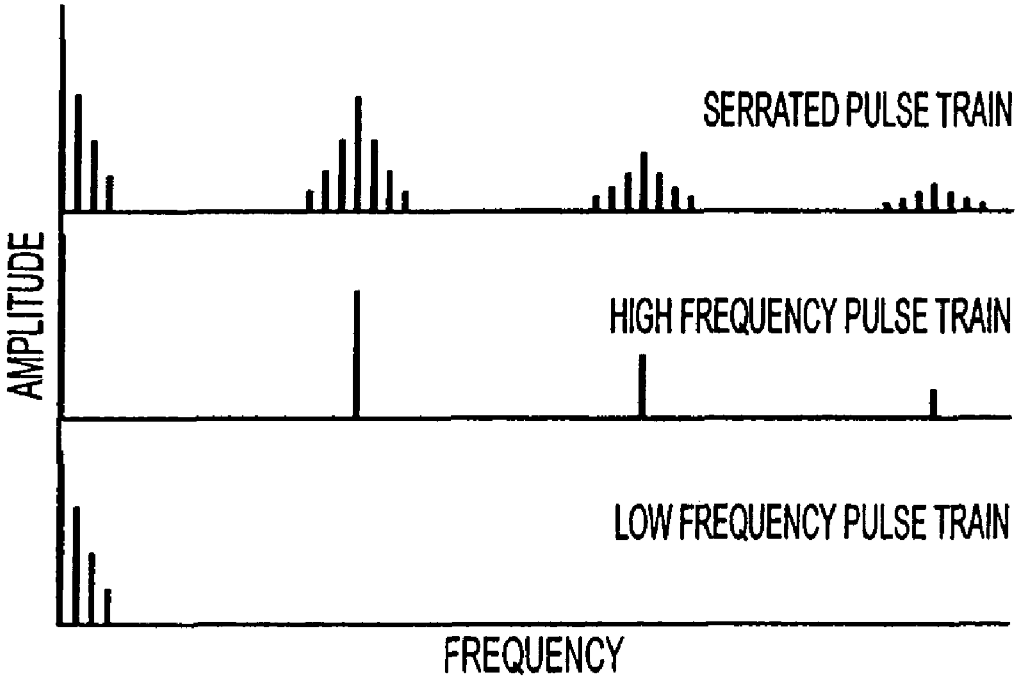
FIG. 4 is an exemplary diagram showing spectra corresponding to the low and high frequency pulse trains and the serrated pulse train in FIG. 3.

The low frequency pulse (blink frequency) is usually restricted to approximately 1 to 10 Hz to make visual interpretation easy. The low frequency pulse train depicted in FIG. 3 produces spectral energy at the fundamental and harmonics of the low pulse train repetition frequency, as shown in FIG. 4.

Similarly, the high frequency pulse train produces spectral components at the fundamental and harmonics of its pulse repetition frequency. In the time domain (FIG. 3), the serrated pulse train can be thought of being produced by the multiplication of the low and high frequency pulse trains (adjusted for offsets).

Since multiplication in the time domain produces convolution in the frequency domain, the spectrum of the serrated pulse train includes sum and difference frequencies of the fundamental and harmonics of both the low and high frequency pulse trains. To avoid audible interference in electronics that use this technique, the high frequency pulse repetition frequency should preferably be greater than approximately 20 KHz plus a small additional amount to account for the lower sidebands below the fundamental of the high frequency pulse. Of course, there are differences between individuals, i.e., some people cannot recognize 18 KHz signal, while others can recognize 22 KHz signal. However, since it is well known that most people cannot hear or can ignore approximately 20 KHz signal or more, it may be reasonable to set the high frequency pulse repetition frequency to be greater than approximately 20 KHz for a practical reason.

The critical flicker frequency (the frequency above which the human eye interprets a pulsed light source as continuously on) increases with increasing luminance and may be approximated by the Ferry-Porter Law. High LED blink rates require higher LED luminance (and higher LED currents) than low LED blink rates. When operating at high LED blink rates, resistor 24 in FIG. 2 needs a lower value than at lower blink rates.

Figure 5:
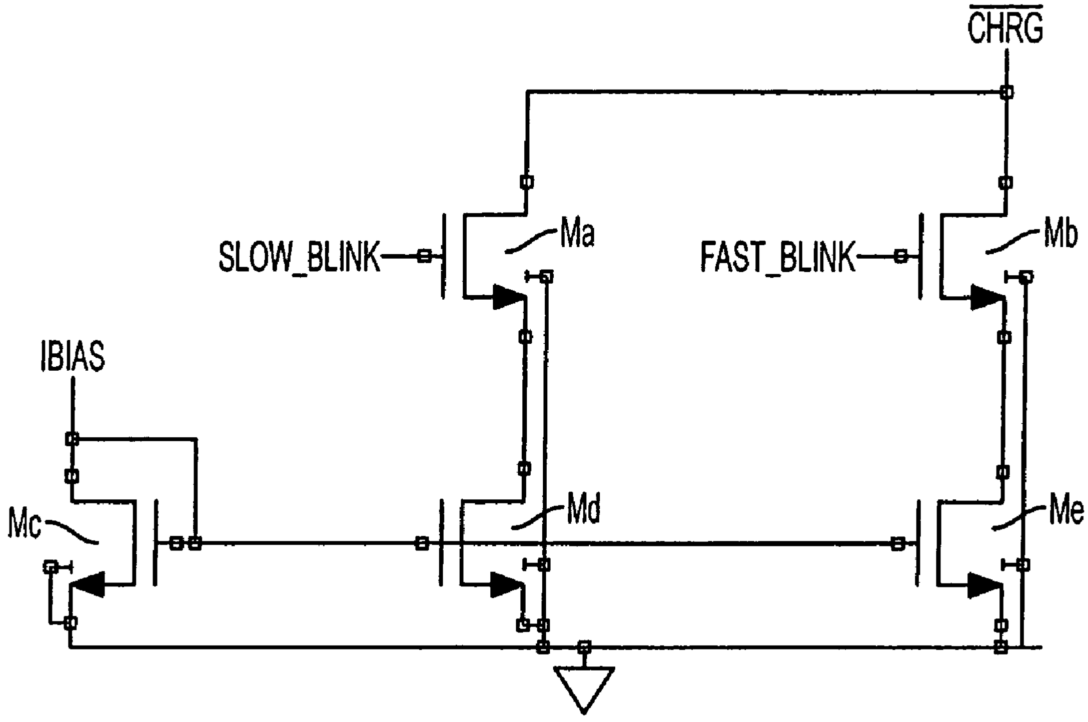
FIG. 5 is an example of a circuit topology for adjusting LED current for various blink rates of the serrated pulse train according to one embodiment of the disclosure.

If several LED blink rates are used to convey several states either the LED current must be large enough to support the highest blink rate, or the LED current may be tailored to each blink rate (see FIG. 1). FIG. 5 is an example of a circuit topology for adjusting LED current for various blink rates of the serrated pulse train including transistor Ma, Mb, Mc, Md and Me. In this example, transistors Ma and Md provide low current for low blink rates, and transistors Mb and Me provide high current for high blink rates. The advantage of tailored LED current is reduced power consumption at low blink rates.

Figure 6:
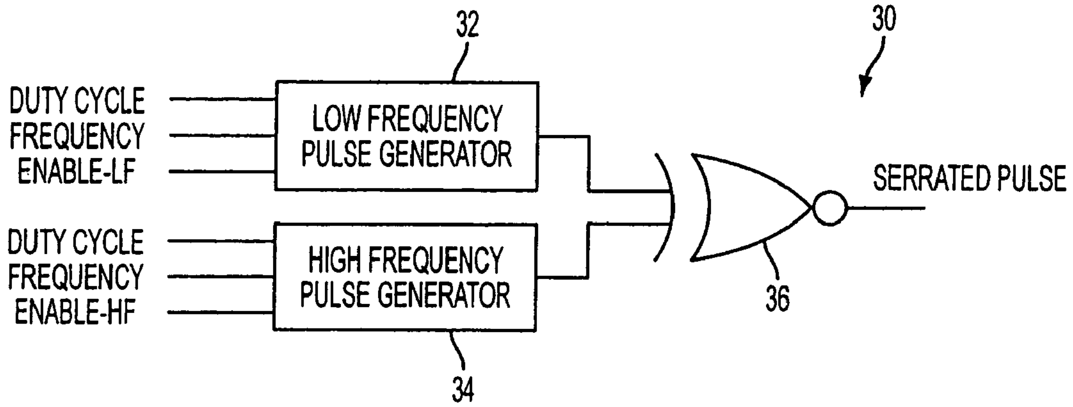
FIG. 6 is a first exemplary block diagram of a pulse generator according to an embodiment of the disclosure.

Generation of the serrated pulse train will now be described. FIG. 6 is an exemplary block diagram of a generator 30, which may include low frequency pulse generator 32, high frequency pulse generator 34 and XNOR gate 36. To generate the serrated pulse train, XNOR gate 36 combines low and high frequency pulse trains from low frequency pulse generator 32 and high frequency pulse generator 34. XNOR gate 36 produces the serrated pulse by producing logic high whenever the low and high frequency pulse trains have the same logic state (see FIG. 3). In a similar fashion, an exclusive OR gate may be used instead of XNOR gate 36, but the serrated pulse train that results is the complement of the serrated pulse train shown in FIG. 3.

Generator 30 further includes control lines for duty cycle and frequency programming, which enable for generating a variety of status signals. Persons skilled in the art will appreciate that with input of control signals through the control lines to generator 30, all of the status signals shown in regions A to E of FIG. 1 may be generated by generator 30.

In this example, the best result may be obtained if the high frequency to low frequency ratio is an integer for every possible frequency combination. Without this restriction, there may not be a fixed timing relationship between edges in the high and low frequency pulse trains in this example. This tends to produce glitches and runt pulses in the serrated pulse, and variations in serration width in the vicinity of the low frequency pulse train edges, complicating interpretation by a microprocessor.

Figure 7:
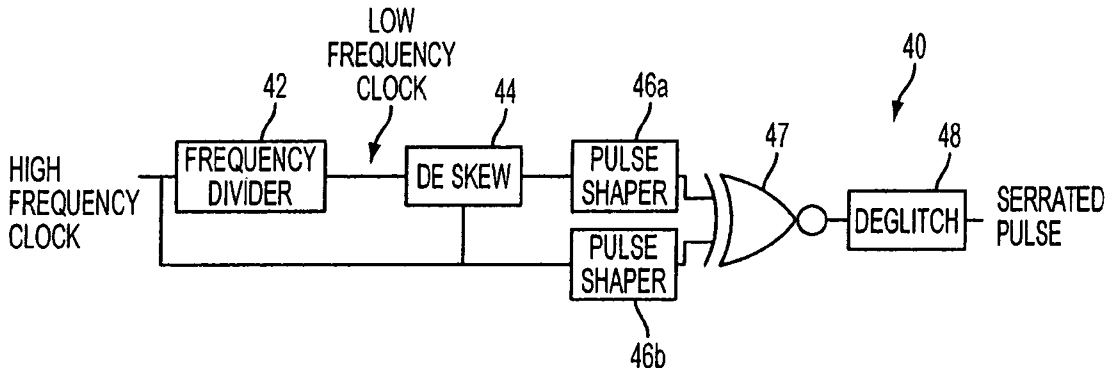
FIG. 7 is a second exemplary block diagram of a pulse generator according to an embodiment of the disclosure.

Several methods may be used to produce clocks with integer frequency ratios. A high frequency clock may be generated from a low frequency clock by frequency multipliers, or via an analog or digital phase locked loop. FIG. 7 is an example of a generator to produce clocks with integer frequency. In generator 40 of FIG. 7, a high frequency clock is divided down to generate a low frequency clock. Generator 40 includes frequency divider 42, deskew unit 44, pulse shaper 46*a* and 46*b*, XNOR gate 47, and deglitch unit 48.

Frequency divider 42 in FIG. 7 may be either synchronous or asynchronous using ripple carry. A fully synchronous divider has low clock to output propagation delay, which may eliminate the need for de-skewing and reduce the demands on the deglitch circuit. An asynchronous divider has much higher clock to output propagation delay and requires either de-skewing or much larger deglitching. However, an asynchronous divider typically draws less power (especially obvious in CMOS based logic clocked at high frequencies).

Pulse shapers 46*a* and 46*b* may be configured with monostable multivibrators or with small state machines. If state machines are used, pulse shaper 46*a* may use the low frequency clock, and pulse shaper 46*b* may use the high frequency clock as their respective master clocks. If a state machine is used on the low frequency path, deskew unit 44 may be placed after the pulse shaper. A D type flip-flop clocked with the high frequency clock can be used for deskewing unit 44. XNOR gate 47 combines outputs from pulse shapers 46*a* and 46*a*, and supplies the combined signal to deglitch unit 48. Deglitch unit 48 may include an RC low pass filter and a Schmitt trigger. The high frequency clock, frequency divider ratio, and pulse width produced by the pulse shapers may be programmed to indicate a variety of status conditions.

Figure 8:
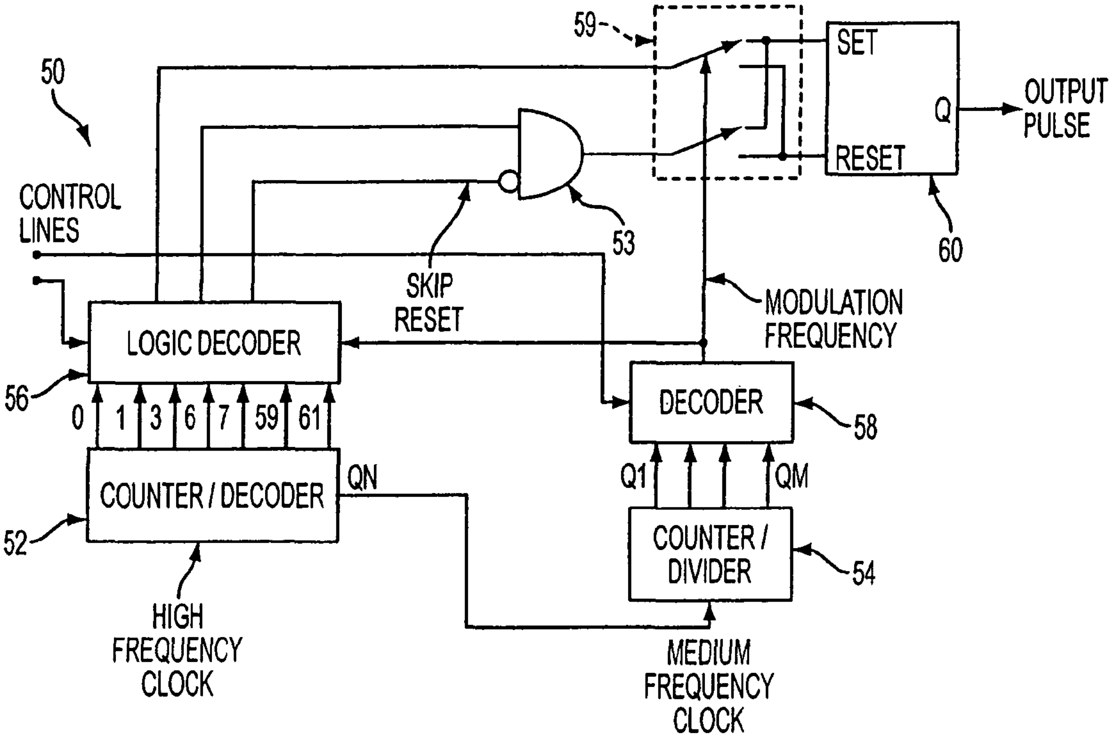
FIG. 8 is a third exemplary block diagram of a pulse generator according to an embodiment of the disclosure.

FIG. 8 is another example of a generator for generating a deglitched serrated pulse. In this design, logic decoder 56 provides three pulses, one to set and another to reset SR latch 60, as well as a signal to skip the next reset signal by disabling logic gate 53. The skip reset signal is generated via a one-shot signal that is triggered on the low-to-high transition of the modulation frequency. This latch is then reset using the 7 count, selected as a convenient interval after the last reset pulse is generated. The set and reset pulses last for only one state of counter/decoder 52. Decoder 56 produces these pulses which are programmed through the input control line to pick the pulse width as a fraction of the high frequency clock. The set and reset outputs from logic decoder 56 are always programmed in a manner that prevents both outputs from simultaneously going high. Counter/decoder 52 also includes flip-flops Q1, Q2, . . . , QN (not shown) which perform frequency division of the high frequency clock. Counter/divider 54 includes flip-flops Q1, Q2 . . . , QM (not shown) which perform frequency division of the medium frequency clock to produce the low-speed modulation frequency.

Decoder 58 output is routed to combinational logic or transmission gates 59 (depicted as a double throw switch) that can interchange the inputs of SR latch 60. In this manner, the left most output of logic decoder 56 sets the flip-flop with the switch in the upper position, but resets the flip-flop with the switch in the lower position. The second output of the logic decoder 56 provides reset with the switch in the upper position and set with the switch in the lower position. The net result is that the Q output of SR latch 60 will produce a pulse train with the switch down that is the compliment of the pulse train with the switch up. The timing of the skip reset signal ensures that SR latch 60 prevents any glitches from occurring.

Figure 9:
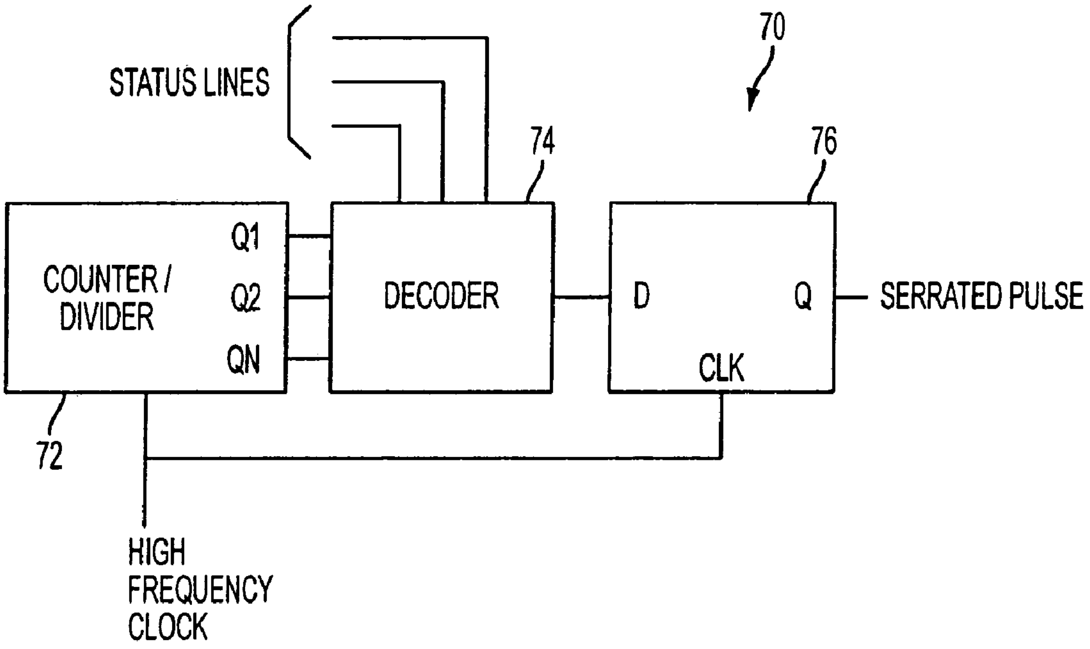
FIG. 9 is a fourth exemplary block diagram of a pulse generator according to an embodiment of the disclosure.

Besides the previously mentioned techniques, a fully synchronous design based on a classic state machine may be used. FIG. 9 shows an example of generator implemented by such a state machine. Generator 70 includes counter/divider 72, decoder 74 and D flip-flop 76. In FIG. 9, status lines are additional inputs to decoder 74, to vary the serrated signal. For example, the duty cycle 10-90 can be changed to 5-95 depending on inputs from the status lines.

In the following, implementation of the above generators into a battery charger will be discussed. FIGS. 10 and 12-14 illustrate exemplary circuitry to drive the NMOS pull-down transistor at the /CHRG pin. The circuitry of FIGS. 10 and 12-14 corresponds to generator 40 of FIG. 7, for example.

Figure 10:
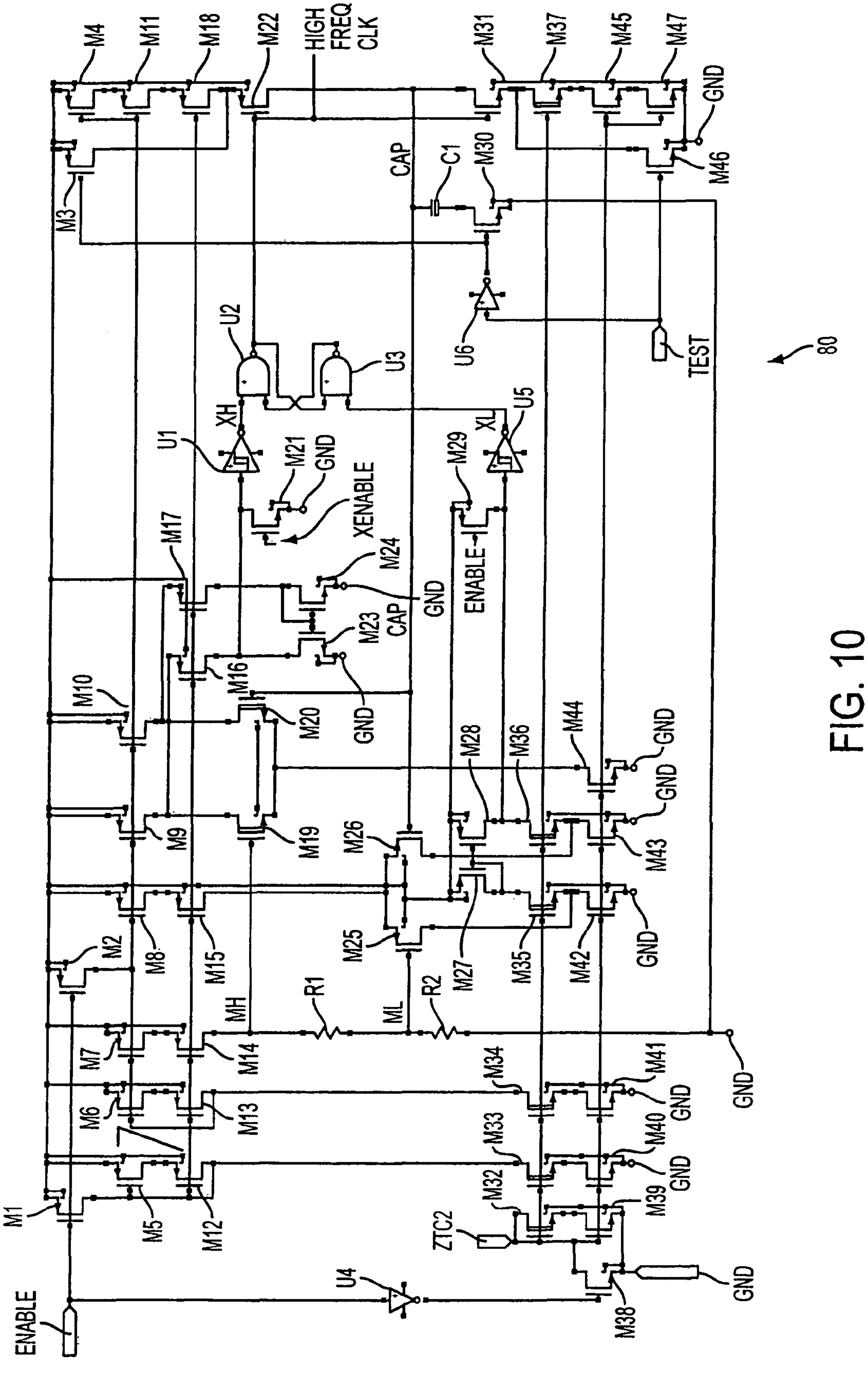
FIG. 10 is an example of a circuit topology of an oscillator according to an embodiment of the disclosure.

FIG. 10 is an example of a circuit topology of an oscillator (high frequency clock generator). In oscillator 80, a triangle wave is produced on line CAP by alternately charging and discharging capacitor C1 via a switchable constant current source (transistors M4, M11, M18 and M22) and current sink (transistor M31, M37, M45 and M47). A SR latch formed by cross coupled NAND gates U2 and U3 determines whether current is sourced or sunk. The state of the SR latch is determined by two comparators, formed by differential pairs M19 and M20, and M25 and M26, whose thresholds are set by voltages on nodes MH and ML. Because voltages on nodes MH and ML maintain a tight ratiometric relationship to the currents used to charge and discharge capacitor C1, frequency is insensitive to supply voltage and temperature variation.

A squarewave is available at the node High Freq Clk, and has a frequency of 49 KHz in this example. If input TEST is driven high, operating frequency is increased approximately 100 times. In addition, pin ENABLE is included to shut off oscillator 80 and conserve power.

In more detail, terminal ZTC2 provides supply current to diode-connected transistors M32 and M39. NMOS transistors M39, M40, M41, M42, M43, M44, M45 and M47 form a current mirror string. Native NMOS transistors M32, M33, M34, M35, M36 and M37 form a cascode string. Transistor M32 sets a voltage for the cascode devices, and transistor M39 sets voltage VGS for the current mirror devices. Transistor M38 is turned on and off based on the states of pin ENABLE through inverter U4. Turning off transistor M38 turns off current mirror devices M39, M40, M41, M42, M43, M44, M45 and M47.

Transistors M6, M7, M8, M9, M10 and M11 are current mirror devices. Transistors M13, M14, M15, M16, M17 and M18 are cascode devices. Transistors M5 and M12 are used to set a cascode voltage, and transistor M6 sets voltage VGS of the current mirror devices. Transistors M1 and M2 are used to turn on or off current mirror devices M6, M7, M8, M9, M10, and M4 and M11, and cascode devices M13, M14, M15, M16, M17 and M18.

A current source formed by transistors M7 and M14 provides two reference voltages: one is voltage drop in resistor R2, which sets a lower threshold voltage of oscillator 80 on node PL, and a voltage drop across resistors R1 and R2, which-sets an upper threshold voltage on node MH.

The lower voltage comparator comprises differential pair transistors M25 and M26, mentioned above, the tail current of which is set by transistors M8 and M15. Drains of the differential pair are coupled to current sources M42 and M43, and cascode devices M35 and M36 which are connected to current mirror M27 and M28. The drain of transistor M28 is connected to the input of Schmitt trigger U5. Output XL of Schmitt trigger U5 is driven low when the voltage on line CAP goes down to the lower threshold voltage.

The upper voltage comparator comprises differential pair transistors M19 and M20. The tail current is set by transistor M44. Current sources M9 and M10 are coupled to the drains of transistors M19 and M20. The output of the differential pair is coupled to cascode devices M16 and M17 connected to current mirror M23 and M24, and goes into Schmitt trigger U1. Schmitt trigger U1 provides output XH which goes low when the voltage on line CAP reaches the upper threshold voltage.

Figure 11:
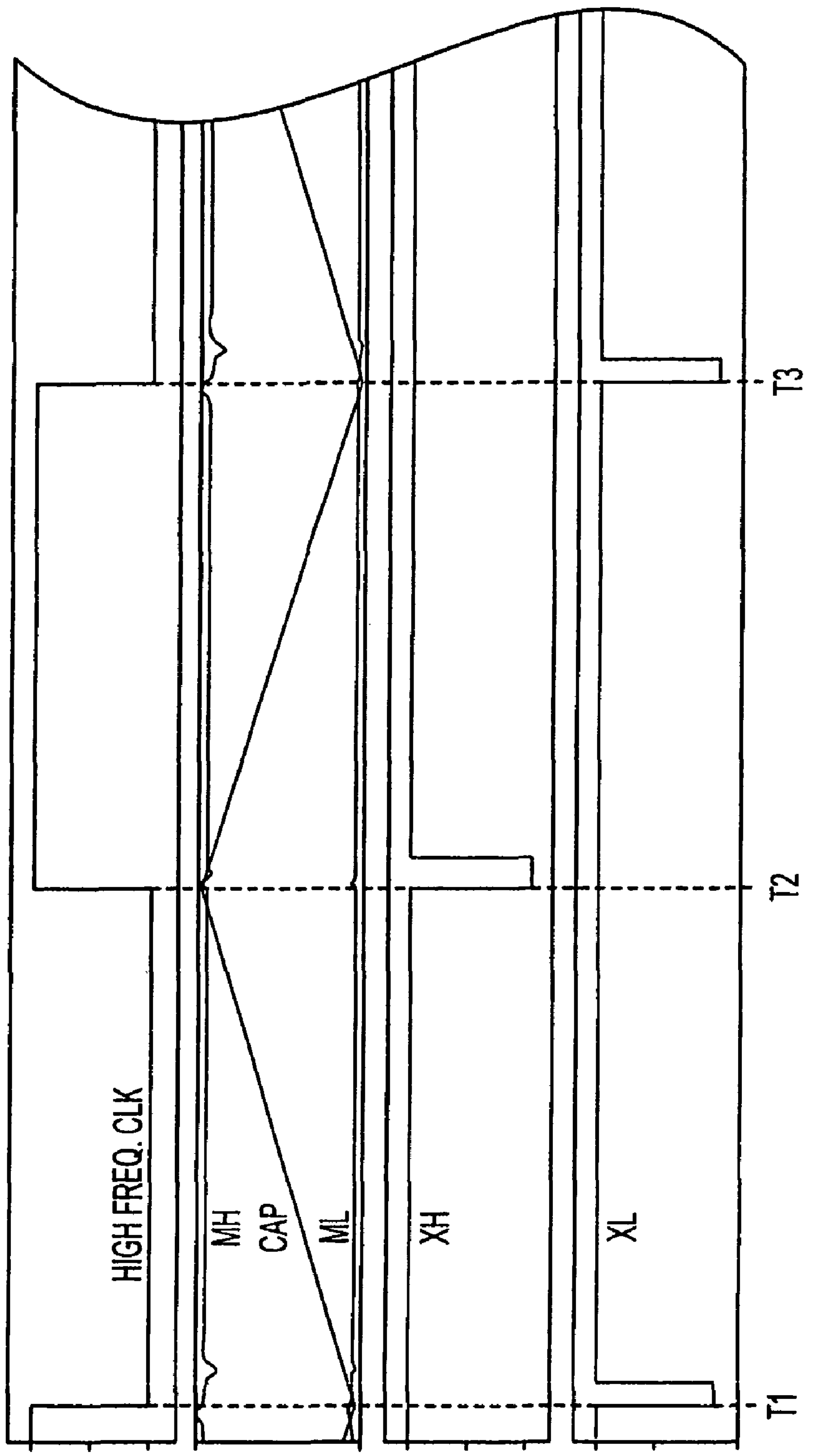
FIG. 11 is exemplary waveforms of the oscillator shown in FIG. 10.

FIG. 11 is exemplary waveforms of oscillator 80 shown in FIG. 10. At time T1, the voltage of line CAP reaches lower comparator threshold voltage ML. Under this condition, the lower voltage comparator (M25 and M26) forces output XL of Schmitt trigger U5 to become low, causing the output of the SR latch (U2 and U3) to be low. Accordingly, the upper current source (M4, M11, etc) is turned on, and the lower current source (M45, M47, etc) is turned off, causing line CAP to increase in voltage. At the same time, high frequency signal High Freq Clk, i.e, an output from the oscillator of FIG. 10, goes low. As the capacitor voltage rises above lower comparator threshold ML, the output (XL) of Schmitt trigger U5 goes high, but the output of the SR latch stays latched in the output low state, and thus, high frequency signal High Freq Clk stays low.

At time T2, the voltage of line CAP reaches upper comparator threshold voltage MH. The upper comparator (M19 and M20) forces output XH of Schmitt trigger U1 to become low, causing the output of SR latch (U2 and U3) to go high. Therefore, the upper current source (M4, M11, etc) is turned off, and the lower current source (M45, M47, etc) is turned on, causing line CAP to decrease in voltage. High frequency signal High Freq Clk goes high. When the voltage of line CAP decreases below upper comparator threshold voltage MH, the output (XH) of Schmitt trigger U1 goes high, but the output of the SR latch stays latched in the output high state, and high frequency signal High Freq Clk thus stays high.

As described above, the upper and lower comparators generate set and reset signals to be applied to the SR latch according to the voltage level of line CAP. The SR latch has a memory function to maintain its output voltage high or low until either output XH of Schmitt trigger U1 or output XL of Schmitt trigger U5 goes low. Squarewave high frequency signal High Freq Clk of the oscillator is generated by utilizing such memory function of the SR latch.

At the input of Schmitt trigger U1, there is transistor M21 which forces the SR latch into a known state when oscillator 80 is shut off. Transistor M29 has a function similar to transistor M21.

Pin TEST is connected to inverter U6 and transistor M46. When test PIN is driven high, oscillator 80 produces a clock having higher frequency for testing purpose. Greater charging current flows into capacitor C1, not through the cascoded current sources. Inverter U6 is used to turn off transistor M30 to disconnect capacitor C1 from line CAP. Small capacitance and larger charging current provide a very quick oscillation frequency for testing.

Figure 12:
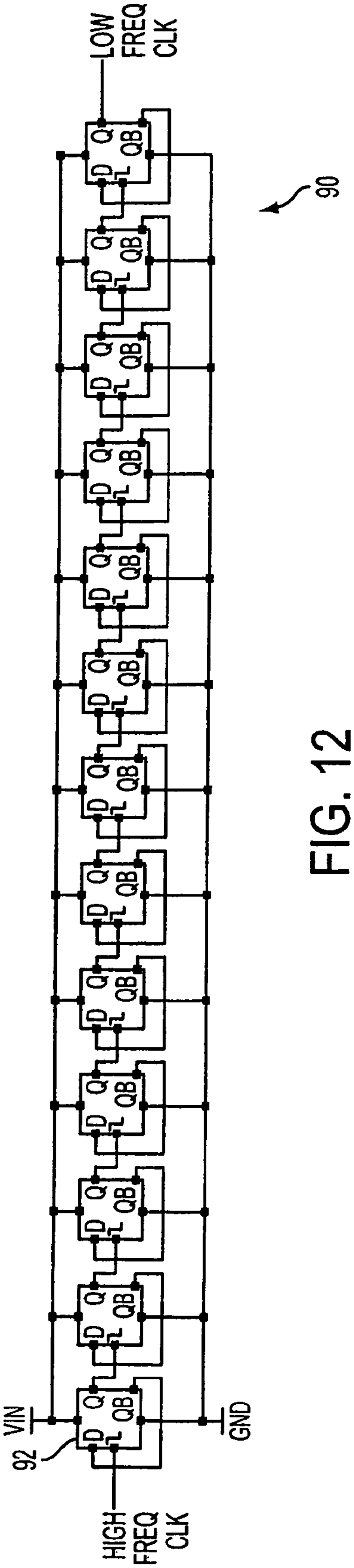
FIG. 12 is an example of a circuit topology of a frequency divider according to an embodiment of the disclosure.
Figure 13:
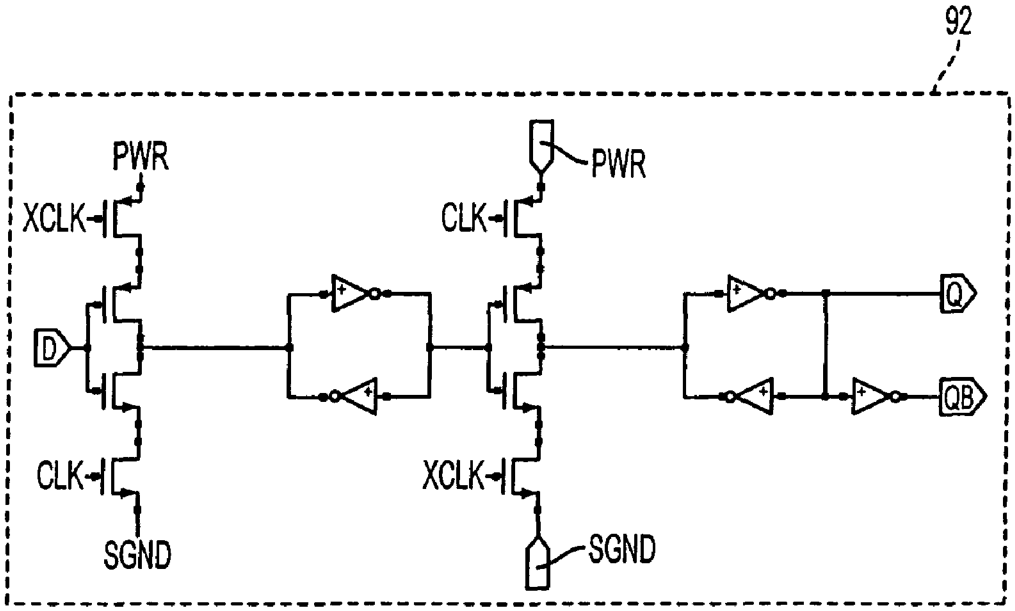
FIG. 13 is an example of a flip-flop circuit implemented in the frequency divider of FIG. 12.

FIG. 12 is an example of frequency divider 42 of FIG. 7. The output of oscillator 80 of FIG. 10 is coupled to frequency divider 90 producing the low frequency pulse. Frequency divider 90 includes N (N: integer) D flip-flops 92. A cheater latch D-flip-flop shown in FIG. 13 may be used as D flip-flop 92.

Frequency divider 90 is based on ripple counting rather than a fully synchronous design in order to simplify decoding and lower power consumption. Ripple counting, however, produces higher clock to output propagation delay than a synchronous divider, and thus, requires a deskew circuit. Also, the number of stages of flip-flops may be different in various designs based on oscillator frequency and the desired characteristics of the serrated pulse patterns.

Figure 14:
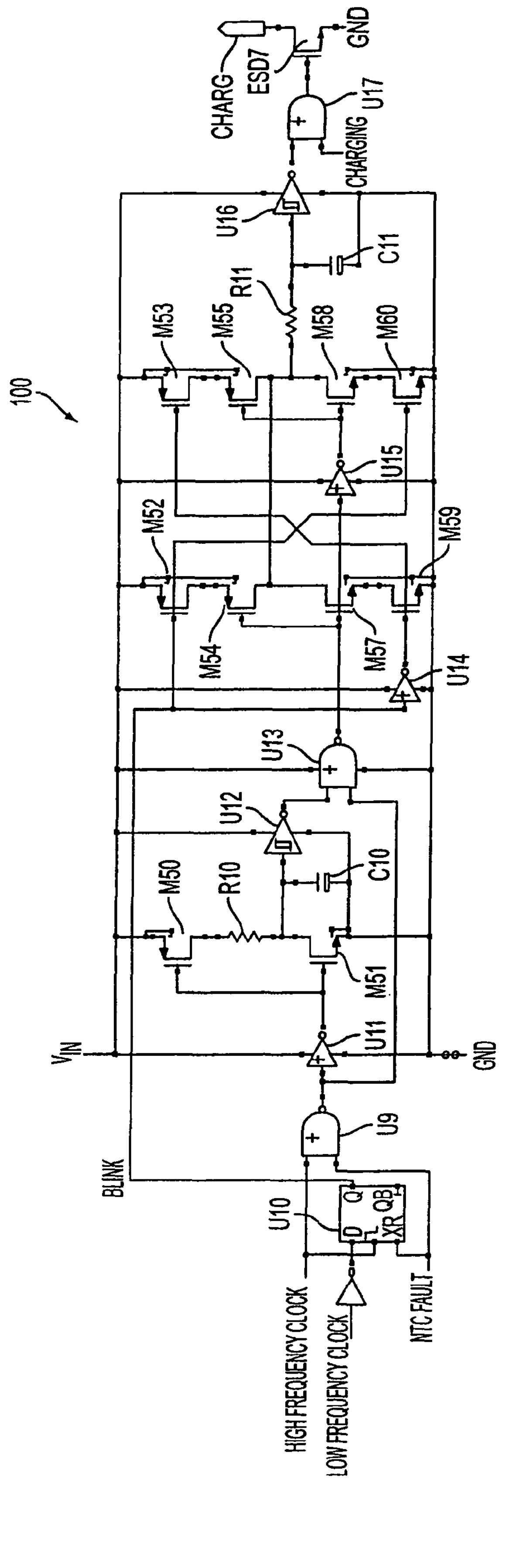
FIG. 14 is an example of a circuit topology of a serrated pulse generator and a deglitcher used for a battery charger according to an embodiment of the disclosure.
Figures 15A, 15B, 15C, 15D, 15E:
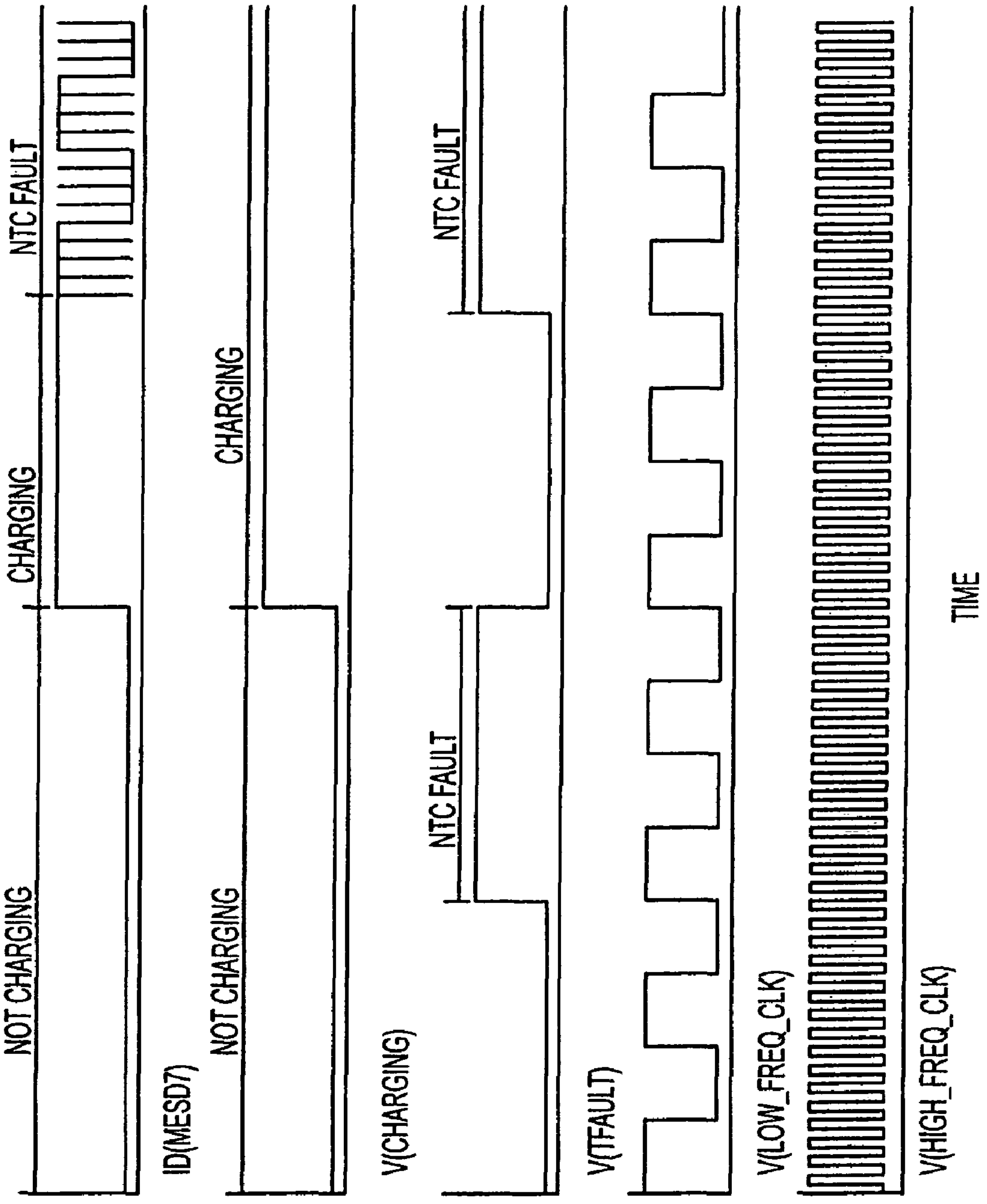
FIGS. 15A-15E shows exemplary waveforms generated by the oscillator of FIG. 10, the frequency divider of FIG. 12 and the serrated pulse generator of FIG. 14.

FIG. 14 is an example of a serrated pulse generator and a deglitcher able to be used with battery charger 10. FIGS. 15A-15E are exemplary waveforms generated by oscillator 80 of FIG. 10, frequency divider 90 of FIG. 12 and serrated pulse generator 100 of FIG. 14. It is noted that the ratio between the high frequency pulse and the low frequency pulse is adjusted for the illustration purpose. As shown in FIG. 14, serrated pulse generator 100 receives the low frequency pulse (FIG. 15D) and the high frequency pulse (FIG. 15E). In this example, the high frequency clock pulse has a frequency of 49 KHz, and the low frequency clock pulse has a frequency of 1 Hz and a duty cycle of 50%. Serrated pulse generator 100 also receives a NTC fault signal (or battery defective signal) (FIG. 15C). The NTC fault signal in the high state shows, for example, that the voltage at pin NTC (see FIG. 2) drops below $0.35 \cdot V_{IN}$ at hot temperatures or rises above 0.75·VIN at cold (NTC fault).

An output of flip-flop U10 is 1 Hz square wave (signal BLINK). Signal BLINK is held low unless the NTC fault occurs (FIG. 15C). D type flip-flop U10 provides deskewing of the low frequency clock from frequency divider 90 because frequency divider 90 (ripple counter) produces excessive propagation delay. Edges of the low frequency clock pulse (signal BLINK) from output Q are synchronized with edges of the high frequency clock pulse.

The high frequency pulse and the NTC fault signal are provided to NAND gate U9, the output of which is coupled to a circuit formed by inverter U11, transistors M50 and M51, resistor R10, capacitor C10, Schmitt trigger U12 and NAND gate U13. This circuit produces a high duty factor, high frequency pulse train at the output of NAND gate U13. The output of NAND gate U9 stays in high state when the NTC fault signal is low. NAND gate U9 gates the high frequency signal clock into inverter U11 according to the NTC fault signal.

The output of NAND gate U13 (high frequency pulse train) and signal BLINK (low frequency pulse train) are passed into an XNOR gate formed by inverters U14 and U15, and transistors M52-M55 and M57-M60. As signal BLINK alternates between high and low states, the output of the XNOR gate connected to resistor R11 alternates between a high duty factor and a low duty factor (see FIG. 3: “serrated pulse train”).

A deglitcher formed by resistor R11, capacitor C11 and Schmitt trigger U16 removes runt pulses and glitches that may occur at the output of the XNOR gate.

AND gate U17 receives the output of the XNOR gate and signal CHARGING (FIG. 15B) which shows that battery 14 is being charged (see FIG. 2). AND gate U17 insures that pull-down transistor ESD7 can only sink current through the /CHRG pin when battery charging actually occurs. Signal CHARGING is driven high when the battery charging is enabled, and input supply voltage $V_{IN}$ is high enough, for example.

When battery 14 is being charged, the output of AND gate U17 is in high state (FIG. 15A). This turns on pull-down transistor ESD7, which pulls down the /CHRG pin, and turns on LED 22 and drives the microprocessor pin (see FIG. 2). The user and processor can, therefore, recognize that battery 14 is charging. On the other hand, when the battery is not being charged, the output of AND gate U17 is low and pull-down transistor ESD7 is turned off. When the NTC fault occurs, the serrated pulse is outputted from AND gate U17, and transistor ESD7 is repeatedly turned on and off according to the blink frequency (FIG. 15A). Thus, LED 22 blinks based on the frequency of the low frequency pulse (alternating frequency), and microprocessor recognizes that the NTC fault occurs based on the duty cycle of the serrated pulse train.

In the above example, it may be possible to vary the duty cycle and the blink frequency to alternate between the higher duty factor and the lower duty factor to indicate different errors of the battery. Such modification can be made easily by persons skilled in the art. For example, in FIG. 6, generator 30 can provide various serrated pulse trains by combination of instructions regarding the duty cycle and frequency.

A 34.375 KHz high frequency pulse is used in the following example. This frequency is out of the audio frequency band and yet can be measurable by microprocessors with only moderate clock speeds. As discussed below, the 34.375 KHz high frequency pulse may be obtained from a signal generated by a 2.2 MHz oscillator. As shown in Table 1, the outputs of the /CHRG pin may indicate charging, not charging, battery temperature out of range (NTC fault) and unresponsive battery (defective) in this example.

TABLE 1

| | Pulses to be generated | | |
|---|---|---|---|
| Status | High Frequency Pulse | Blink (Alternating) Frequency | Duty Cycle |
| Charging | 34.375 KHz | 0 Hz (Low Z to GND) | 100%-100% |
| Not Charging | 34.375 KHz | 0 Hz (High Z) | 0%-0% |
| NTC fault | 34.375 KHz | 1.526 Hz @ 50% | 4.6875%–95.3125% |
| Bad Battery | 34.375 KHz | 6.104 Hz @ 50% | 9.375%–90.625% |

The non-fault states are represented by D.C. representations of full-on and full-off. The remaining two states are fault states and are described by both a low frequency blinking and a high frequency duty cycle modulated carrier. With this technique, if the microprocessor determines that the duty cycle is either 4.7% or 95.3%, it can recognize that the NTC fault occurs. When the duty cycle is determined to be either 9.4% or 90.6%, the microprocessor can determine that the battery is defective.

A defective battery can be determined in the following manner. For example, when the voltage of pin BAT is below 2.9 V, battery charger 10 may reduce charge current to 10% of a programmed value ("trickle charge"). If the battery remains in trickle charge for a time period, battery charger 10 determines that the battery is defective. Based on this determination, the serrated pulse generator in this embodiment generates a pulse train indicating the battery defect.

The NTC fault signal is a series of pulses that switch between 4.6875% duty cycle and 95.3125% duty cycle. The signal that determines the switchover between these duty cycles is the 1.526 Hz LED blink signal. For example, the NTC fault signals can be generated by:

$$T_{Carrier} = \frac{2^6}{2.2\ \text{MHz}} = 29.09\ \mu\text{s} = 34.375\ \text{KHz}^{-1}$$

4.6875% of Tcarrier=1.3636 μs=3 cycles of the 2.2 MHz clock.

95.3125% of Tcarrier=27.727 μs=61 cycles of the 2.2 MHz clock.

Figure 16:
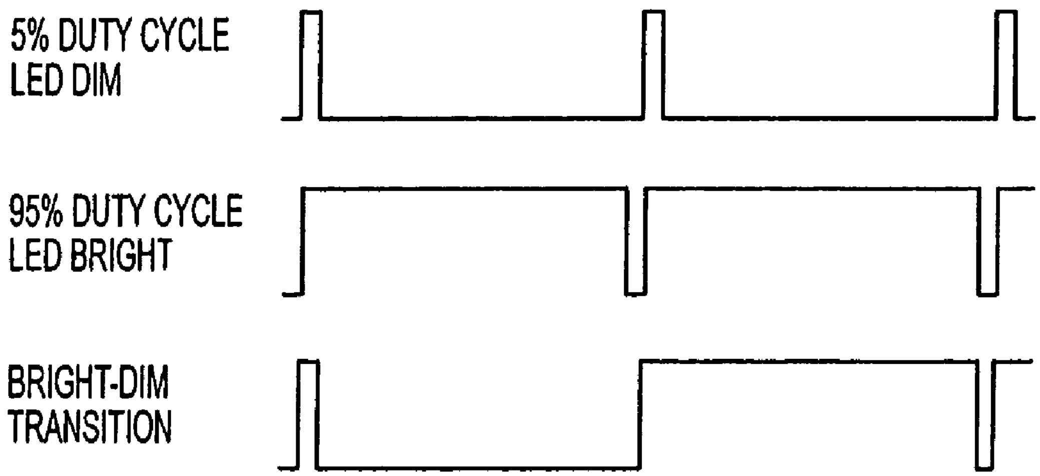
FIG. 16 is an example of waveforms illustrating synchronization of edges of pulses according to an embodiment of the disclosure.

It is important that the two different duty cycles have corresponding rising or falling edges (at least Within a few nano seconds of each other) to ensure that the processor always obtains a clean reading, even at the infrequent 1.5 Hz transition between the low duty cycle and the high duty cycle. FIG. 16 illustrates exemplary synchronization of the edges of the pulses. If the microprocessor starts measuring from a rising edge, then it always picks up a full cycle of either the 4.7% signal or the 95.3% signal.

The bad battery signal is similar to the NTC fault except that its blink frequency is 6 Hz, which appears more "frantic" to the end user. For microprocessor recognition, the duty cycle may be 10% to 90%. The choice of 10% to 90% for the bad battery indication rather than the 5%-95% is not arbitrary. With a 10% duty cycle, it is apparent that the LED is not being turned off all the way. However, at the 6 Hz blink rate it is much less noticeable than it would be at the 1.5 Hz rate for the NTC fault. At 6 Hz it becomes difficult to discern what the "dim" level is at all. Thus, the lower 5% brightness was reserved for the slower 1.5 Hz pulse where it would be more easily noticed.

The bad battery indications may be made as follows:

9.375% of Tcarrier=2.727 μs=6 cycles of the 2.2 MHz clock 90.625% of Tcarrier=26.364 μs=58 cycles of the 2.2 MHz clock To be able to distinguish between the 1.36 μs pulse of the NTC fault and the 2.73 μs pulse of the bad battery fault, a microprocessor may need to have a timer running at a minimum speed of approximately 700 KHz, for example. This should not be a problem with contemporaneous microprocessors.

In this example, considerable precision on the LED modulation rates is provided. These frequencies are intentionally contrived so that they could inexpensively be made a fraction of the 2.2 MHz oscillator (for this example). Specifically, it can be shown that 6.104 Hz can be derived from only the $2^{18}+2^{16}+2^{15}$ quotients of the master clock. Likewise, the 1.526 Hz, ¼ of that, would be decoded similarly but shifted two flops down. Therefore, in principle, it should only take a single three input NAND or NOR gate to derive each of the LED modulation signals.

Figure 17A:
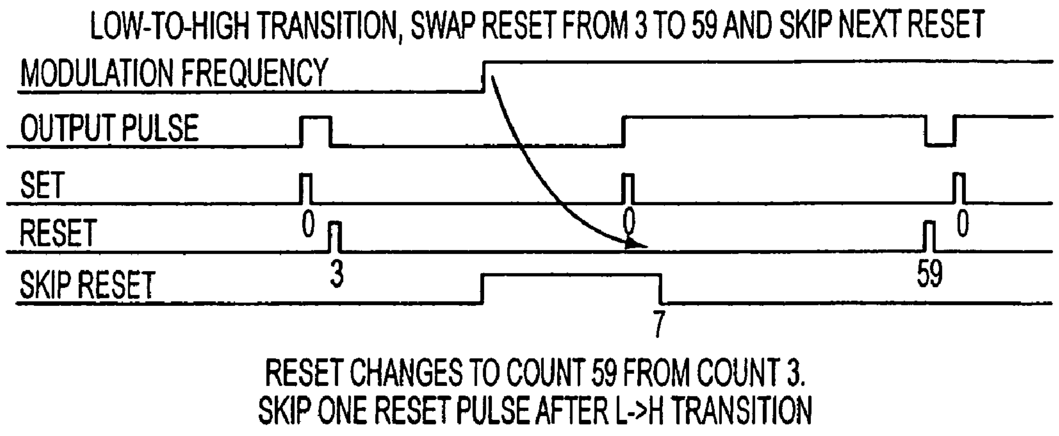
FIGS. 17A and 17B are exemplary timing charts showing generation of a serrated pulse train according to an embodiment of the disclosure.
Figure 17B:
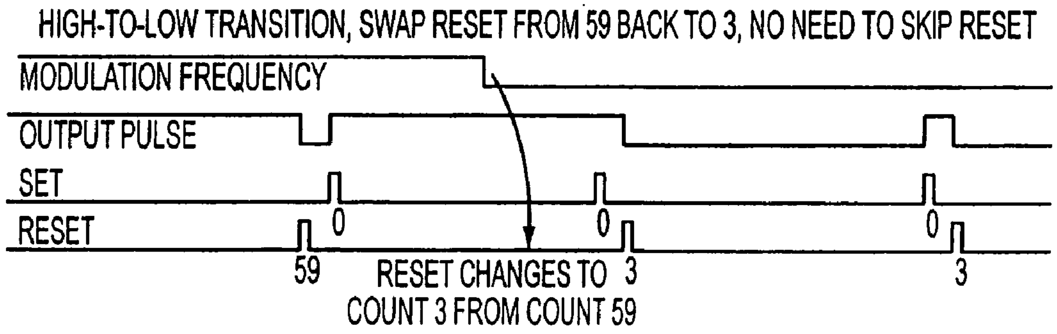

In the following, exemplary generation of the NTC fault signal and bad battery signal will be explained in more detail with the aid of FIGS. 17A and 17B as well as referring back to FIG. 8 illustrating generator 50. First, as described above with referring to FIG. 8, the 2.2 MHz input clock is divided down by a count of 64 to generate the 34.375 kHz clock (QN), and at the same time, several counts of this 2.2 MHz clock are decoded and sent to combinational logic 56. Counts 0, 3, 6, 7, 59, and 61 out of 63 are selectively used to set or reset the output pulse as will be described below.

If the NTC fault is present, a 5%-95% duty cycle may be employed in this example. The 5% duty cycle is accomplished by setting the SR flip-flop 60 at count 0 and resetting at count 3 for a 3/64 or 4.6875% duty cycle. The 95% duty cycle is accomplished by setting the SR flip-flop 60 at count 0 and resetting at count 61, for a 61/64 or 95.3125% duty cycle.

If the bad battery fault is present, a 10-90% duty cycle may be used in this example. The 10% duty cycle is accomplished by setting the SR flip-flop 60 at count 0 and resetting at count 6 for a 6/64 or 9.375% duty cycle. The 90% duty cycle is accomplished by setting at count 0 and resetting at count 58, for a 58/64 or 90.625% duty cycle.

When proceeding from the 5% duty cycle pulse to the 95% duty cycle pulse at the appropriate bright-to-dim transition time defined by the modulation frequency, all that is required is to modify the reset time from count 3 to count 61 and omit performing the next reset at count 3. This is accomplished by disabling the logic gate 53 with the skip reset signal. When reversing from 95% to 5%, the reset time is simply switched from count 61 to count 3, and there is no need to skip a reset as the set occurs first. However, the output is already high, and this, the set has no effect on the output pulse. Likewise in the case of the 10-90% duty cycle transition, a single reset is omitted and the reset times are swapped for the 10-90% duty cycle transitions, and the reset times are simply swapped on the 90-10% transitions. The purpose of omitting the single reset after a low-to-high transition of the modulation frequency is explained with the aid of the timing diagram of FIGS. 17A and 17B.

A skip reset signal may be generated by setting an RS latch (not shown) within the logic decoder 56 via a one-shot signal that is triggered on the low-to-high transition of the modulation frequency. This latch is then reset using the 7 count, selected as a convenient interval after the last reset pulse is generated. Because a latch is used to trigger the low-to-high transition of the serrated pulses, the modulation frequency can be asynchronous to the set-reset pulses.

The 1.5 Hz or 6 Hz modulation frequencies are generated from the 34.375 kHz carrier signal by skipping 5 out of every 16 (or using 11 of every 16) of the 34.375 kHz clock pulses, and then dividing this truncated clock by 4096 or 16384 to get the desired modulation frequency. It is noted that 11/16=½+⅛+1/16 is the same quotient described earlier, just divided by $2^{19}$. The irregular truncated clock is averaged by the subsequent divider chain to smooth out the skipped transitions resulting in a modulation frequency that has nearly 50% duty cycle.

Figure 18:
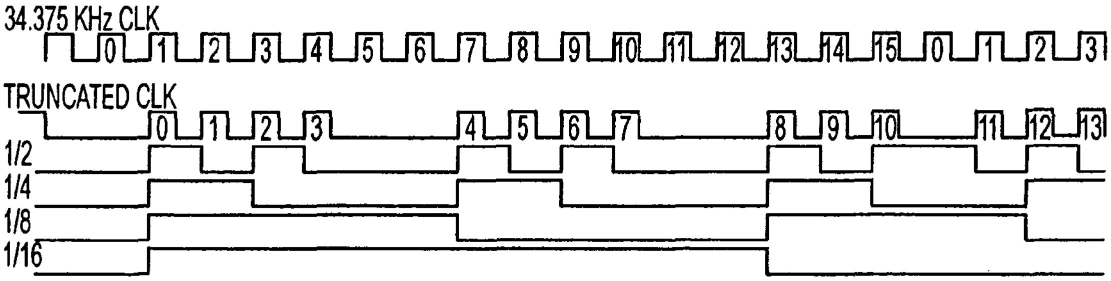
FIG. 18 is an exemplary timing chart showing generation of truncated clock signals according to an embodiment of the disclosure.

The 11 out of 16 pulses are spread out evenly in order to minimize the irregularities in the truncated clock. This is illustrated with a timing diagram in FIG. 18. The top trace represents the 34.375 KHz clock, and the second trace from the top represents the truncated clock, where clock pulses 0, 5, 6, 11, and 12 have been skipped. The following traces are the successive divisions of the truncated clock.

Figure 19:
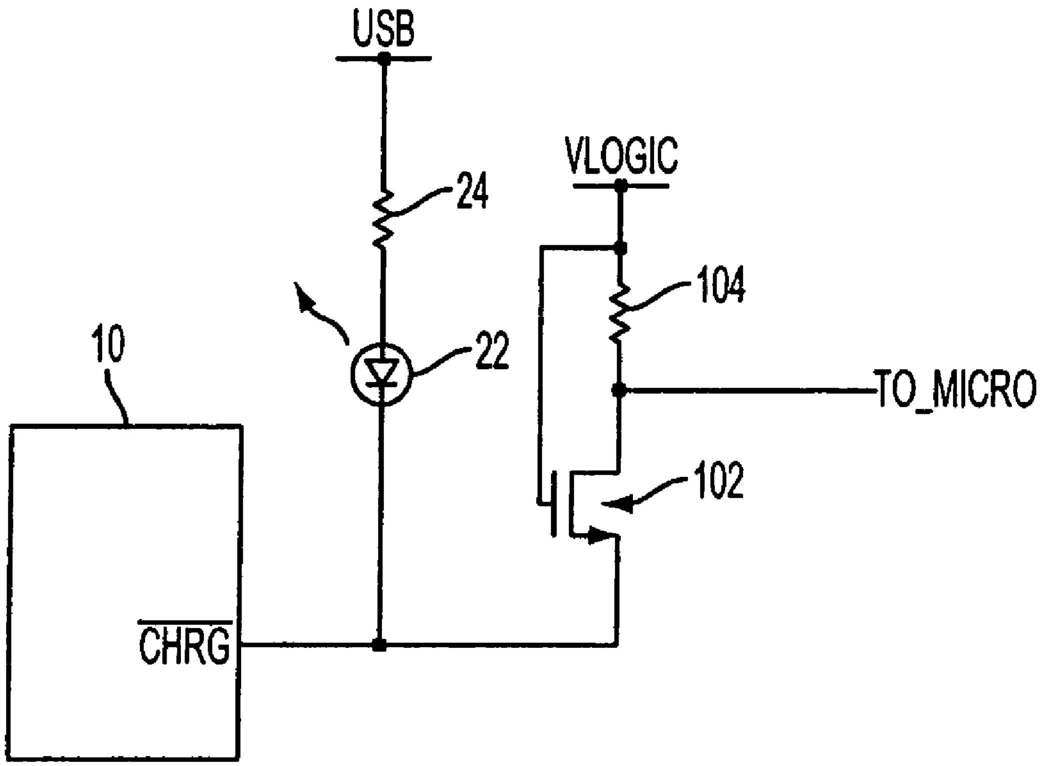
FIG. 19 is an exemplary block diagram illustrating connection of a /CHRG pin of a battery charger according to an embodiment of the disclosure.

FIG. 19 illustrates how to drive LED 22 and the microprocessor pin at the same time when input supply voltage is provided to the battery charger through the USB. When LED 22 is used, the LED pulls up to the battery voltage or the USB voltage. The problem is that a user cannot pull the microprocessor pin up to the USB voltage if it is below a logic supply level. Further, the logic supply may not even be on as the battery charger is meant to run autonomously. The circuit of FIG. 19 may solve these problems, in which transistor 102 and resistor 104 are coupled between the /CHRG pin and logic supply VLOGIC. The drain of transistor 102 is coupled to one end of resistor 104, and the gate is coupled another end of resistor 104 which is coupled to logic supply VLOGIC. The drain voltage of transistor 104 drives the microprocessor pin. This scheme may be effective for a low drop out diode.

Figure 20:
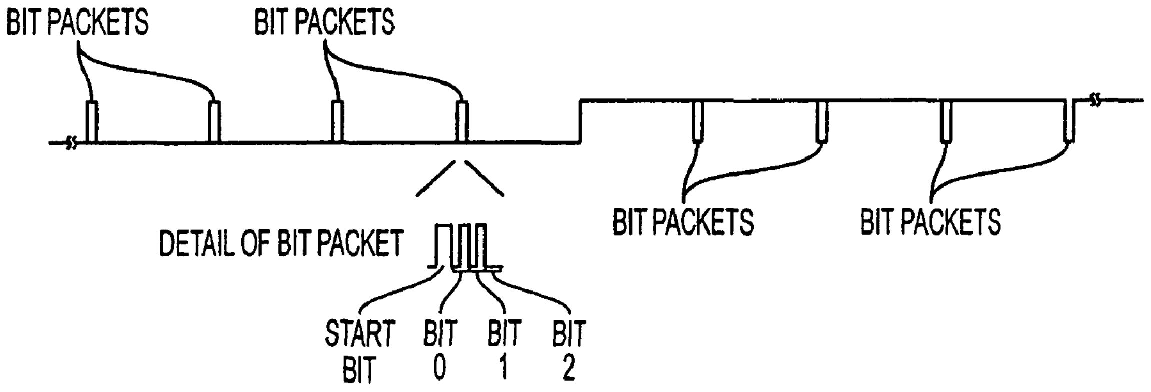
FIG. 20 is an example of a modified serrated signal according to an embodiment of the disclosure.

FIG. 20 illustrates an example of a modified serrated signal. The basic idea is to include within each low and high state a repeating packet of status bits. As long as the average duty cycle of the worst case bit pattern embedded in the "low brightness" part of the low frequency pulse train stays below 10%, the contrast ratio between the high and low brightness states is still reasonable.

Multiple bits are transmitted in a packet that repeats at a rate above 20 KHz to avoid audibility. While the example in FIG. 20 shows a total of three status bits being sent, the number of bits in a packet is arbitrary. The exact method of sending the data is also arbitrary. Any baseband serial transmission scheme can be applied. The technique can use NRZ, return-to-zero, Manchester-Encoding and other self clocking codes, and various pulse-width encoding techniques for data coding. It can also use start and stop bits, run-length limiting, and other techniques to improve bit framing and synchronization.

For the bit packet in FIG. 20, status word 110 is encoded. This is one of a total of $2^3$=8 different bit patterns available in this example. Each individual bit can be used to represent a different potential fault state. For example, bit 0 could indicate whether or not the battery is defective; bit 1 could indicate whether or not the battery is outside normal temperature range; and bit 2 could indicate whether or not the battery is charging.

The bit patterns may also be used more efficiently. It may not be necessary to completely devote a bit to a fault state. For example, providing fault information may not be needed when the battery is not charging, freeing several bit patterns up to other uses.

Figure 21:
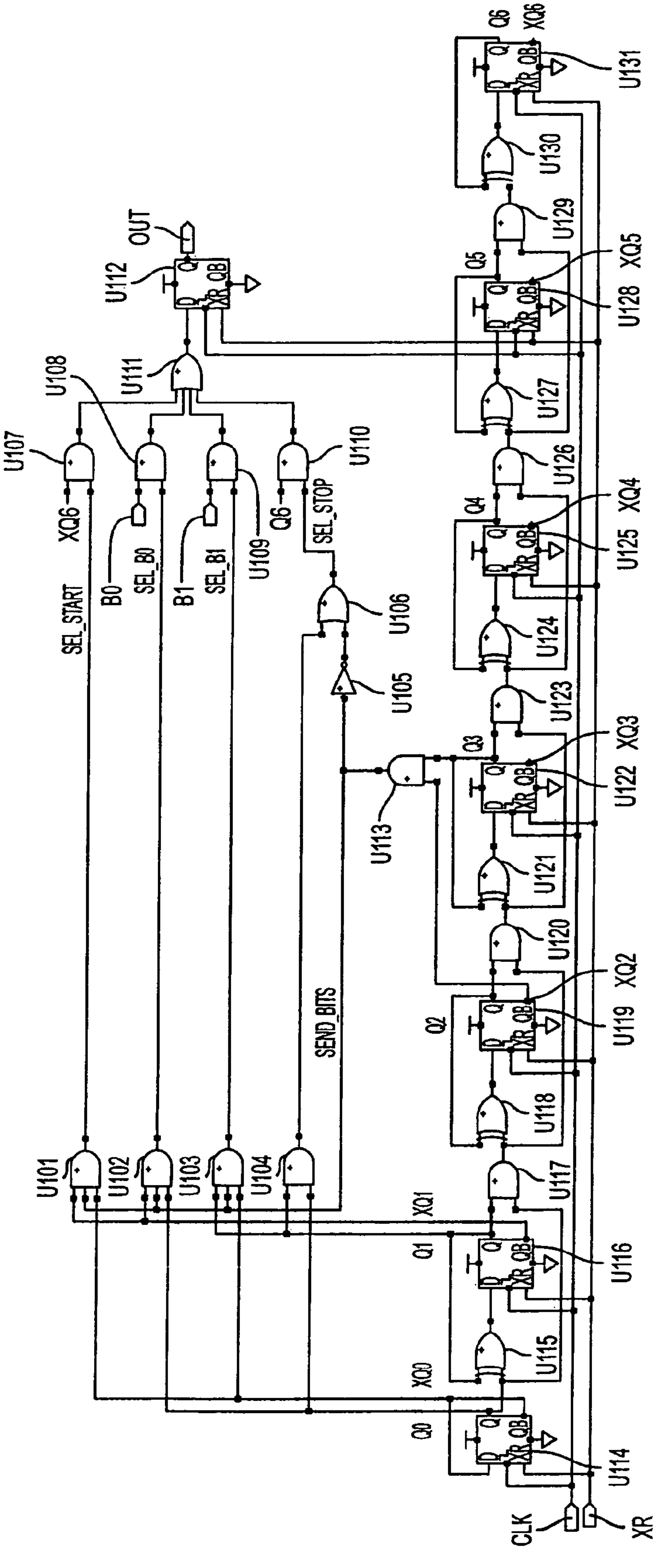
FIG. 21 is an example of a circuit topology of another serrated pulse generator configured for providing multiple status bits used for a battery charger according to an embodiment of the disclosure.

FIG. 21 is an example of a circuit topology of another serrated pulse generator for providing multiple status bits used for a battery charger. The circuit of FIG. 21 is configured to generate a serrated signal with bit packets each including a start bit, two data bits (B0 and B1) and a stop bit, for example. Flip-flop U112 is connected to the gate of pull-down transistor ESD7 of FIG. 14 so that the serrated signal shown in, for example, FIG. 20 can be outputted from the drain of the transistor.

The circuit comprises a synchronous counter chain including devices U114 to U131. The counter is decoded by a decoder formed by AND gates U101 to U106 and U113. The start bit, the two data bits (B0 and B1) and the stop bit are selected in that order by a multiplexer comprising AND gates U107 to U110 and OR gate 111.

The counter chain receives clock signal CLK and complementary reset signal XR. The counter chain is configured for determining how fast the low frequency signal is, how fast each individual bit is sent, and how many times sending each individual bit is repeated.

Two lower bits Q0 and Q1 in the counter chain are inputted to the decoder for selection of either the start bit, one of two data bits (B0 and B1) or stop bit in the multiplexer. For example, bit Q0 is provided to AND gates U102 and U104, and its complement bit XQ0 is provided to AND gates U101 and U103. Bit Q1 is provided to AND gates U103 and U104, and its complement bit XQ1 is provided to AND gates U101 and U102. At any given time, only one of four outputs of the decoder becomes high. For example, signal SEL_START for selecting signal XQ6 complementally to low frequency signal Q6, signal SEL_B0 for selecting data bit B0, signal SEL_B1 for selecting data bit B1 and signal SEL_STOP for selecting low frequency signal Q6 become high sequentially in that order. Inverter U105, OR gate U106 and AND gate U113 for generating signal SEL_STOP are provided to set up how often a bit packet is sent.

Based on the decoder's output, the multiplexer selects one of the start bit, data bit B0, data bit B1 and the stop bit. Flop-flop U112 deglitches the output of OR gate U111, and applies it to the gate of pull-down transistor ESD7 in FIG. 14.

Figure 22:
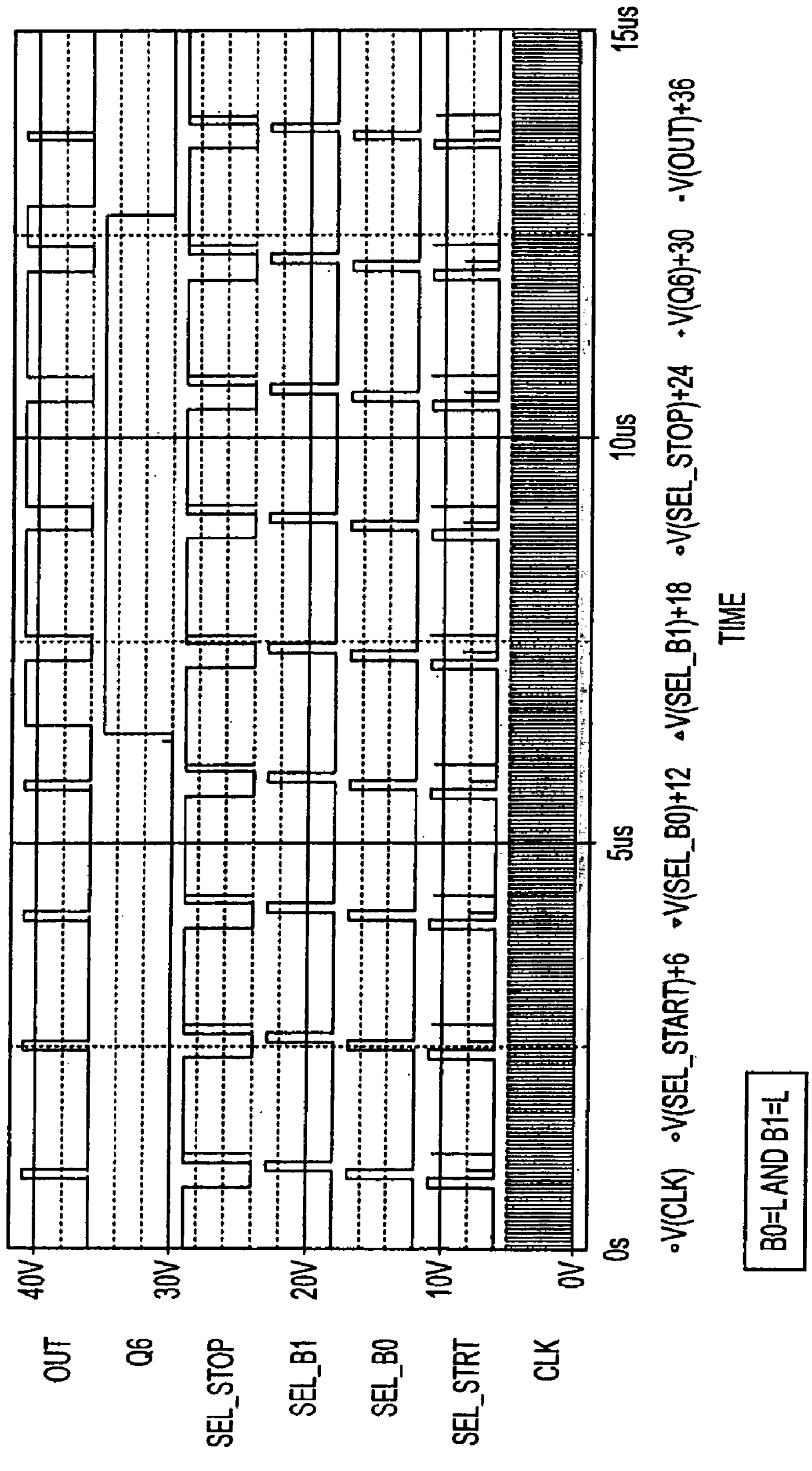
Figure 23:
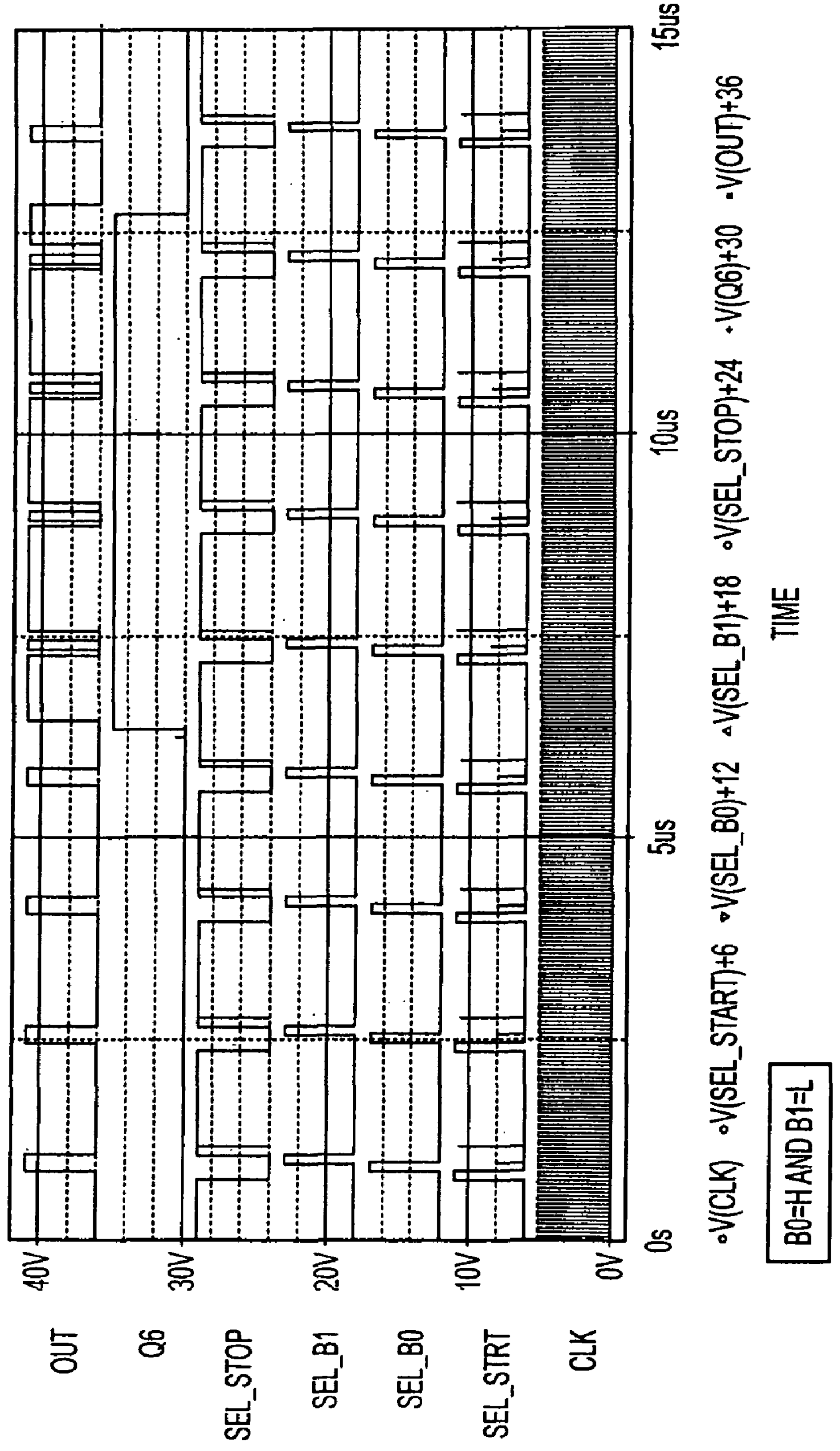
Figure 24:
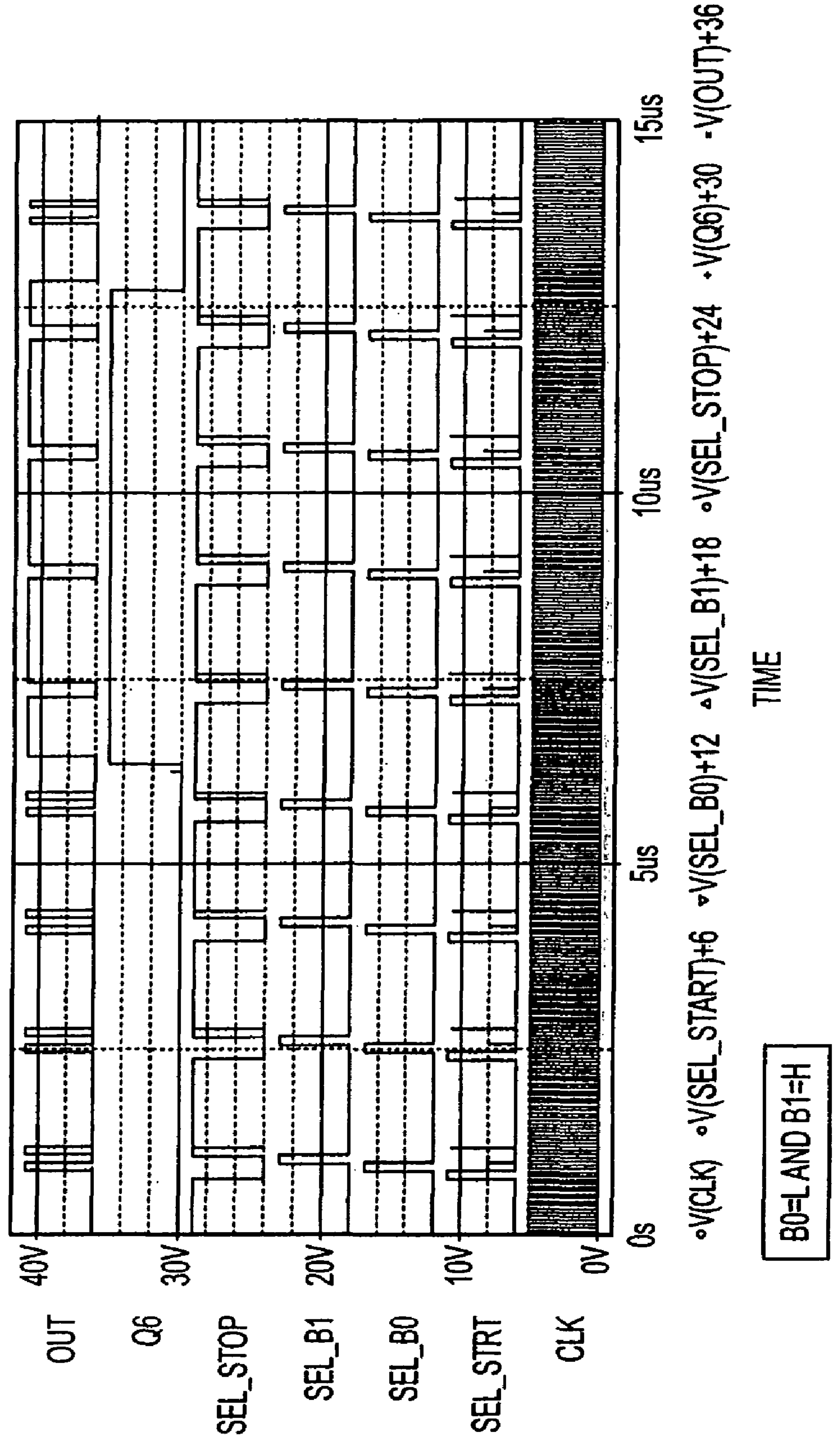
Figure 25:
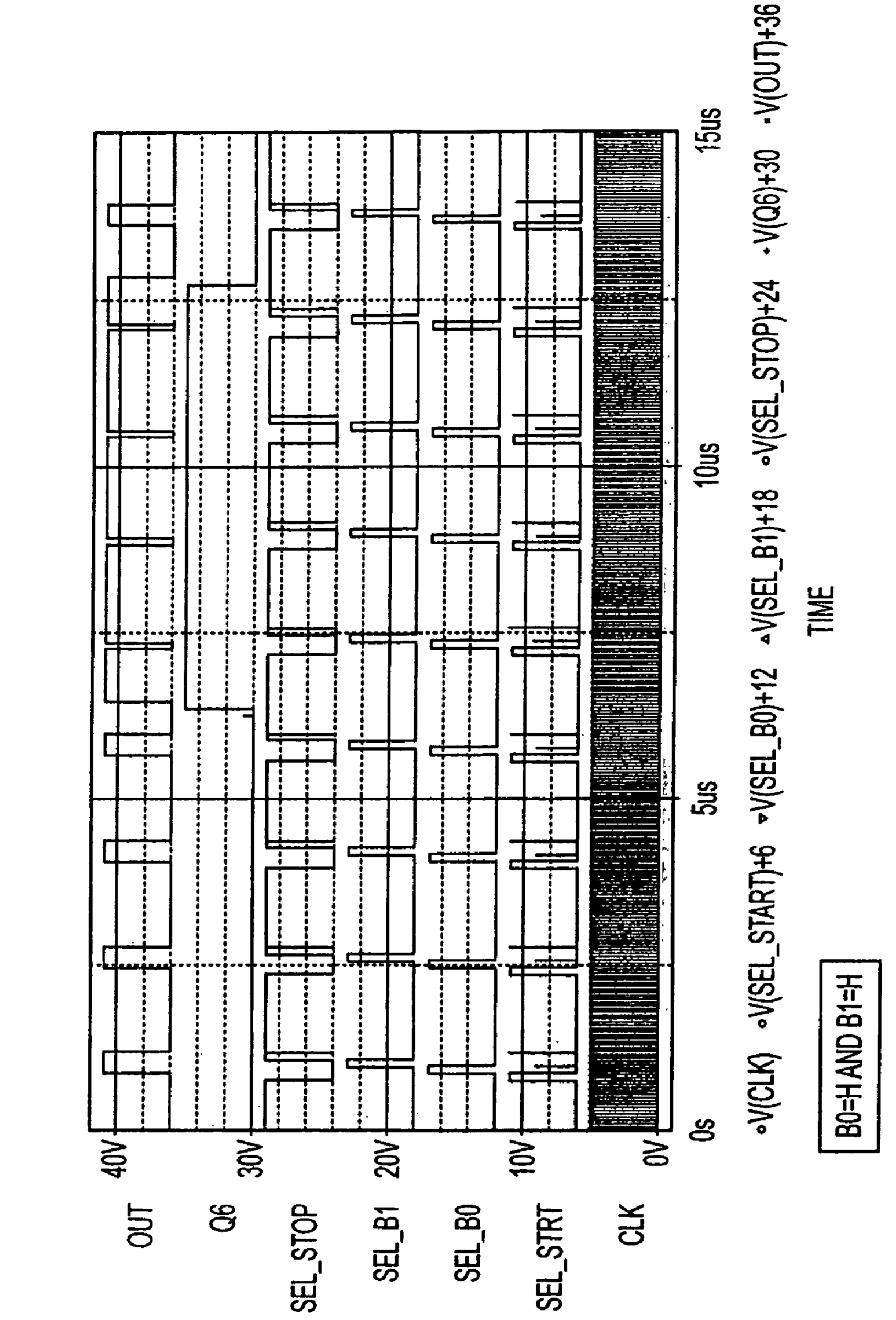

FIGS. 22-25 are exemplary simulated waveforms generated in the circuit shown in FIG. 21. FIGS. 22-25 show clock signal CLK provided to the counter chain, start bit selection signal SEL_STRT, data bit B0 selection signal SEL_B0, data bit B1 selection signal SEL_B1, low frequency signal Q6 from flip-flop U131 and output signal OUT from flop-flop U112 (serrated signal with bit packets). FIG. 22 shows a simulation with B0=L and B1=L, FIG. 23 shows B0=H and B1=L, FIG. 24 shows B0=L and B1=H, and FIG. 25 shows B0=H and B1=H.

In all cases, the output signal OUT consists of a long interval (the stop bit) followed by a start bit which begins with the first edge after the stop interval. If the stop bit is logic low, the beginning of a start bit is indicated by a rising edge. If the stop bit is logic high, the beginning of a start bit is indicated by a falling edge. If the clock frequency is well controlled, the location of bits B0 and B1 can be determined by waiting the correct amount of time after the leading edge of the start bit.

In FIG. 22 starting at T=0, the stop bit is low and the beginning of the start by is indicated by a low to high transition (Start bit=H). The start bit is followed by two low data bits and finally a low stop bit. This process repeats four times. The last bit packet is followed by a stop bit that transitions from logic low to logic high at its midpoint (this occurs shortly after low frequency signal Q6 goes high).

With the stop bit now indicated by logic high, the next start bit begins with a high to low transition (Start bit=L). The start bit is followed by two low data bits and finally a high stop bit. FIGS. 23-25 also show simulations of the other bit combinations.

It is noted that the simulations shown in FIGS. 22-25 represent a simplified version of what would normally be implemented. The bit packet frequency has been increased (and the stop bit time shorted) to improve legibility and to reduce simulation time. In addition, further data bits may be added to this basic design by decoding more of the counter chain.

A possible modification of the circuit of FIG. 21 is to include a second start bit after the first start bit, which is the complement of the first start bit. This can be used to avoid interpreting the mid-stop-bit transition as the beginning of a start bit. If not included two consecutive bit packets should be compared to insure that they agree before concluding that the status bits have been correctly read.

Figure 26:
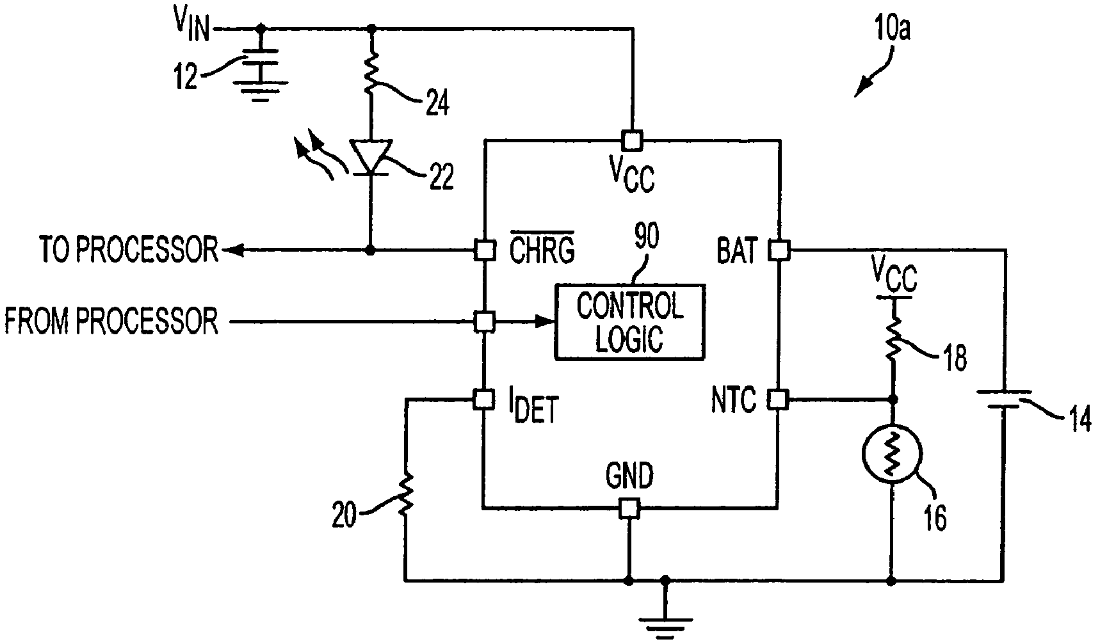
FIG. 26 is an exemplary diagram illustrating a modified battery charger according to one embodiment of the disclosure.

In this embodiment, the serrated pulse train is generated by the battery charger for purpose of explanation. The serrated pulse train is provided to a microprocessor and LED 22 to provide the status of battery 14. Persons having ordinary skill in this art will appreciate that a battery charger includes a controller or control logic to control the battery charger itself. As shown in FIG. 26, control logic 90 of battery charger 10*a* can receive a serrated pulse signal generated by an external controller or a microprocessor as a control signal, and controls its operation modes according to the serrated pulse signal.

As an example, battery charger 10*a* is controlled by the serrated pulse signal shown in FIG. 20 including bit packets. As discussed with reference to FIGS. 20-25, several bits may be encoded in the serrated pulse signal while preserving attributes of the serrated pulse pattern. As shown in FIG. 20, the pulse pattern includes either a long series of zeros followed by a logic one (indicating the start of a bit packet) and one or more data bits, or a long series of ones followed by a logic zero (for the start bit) followed by one or more data bits.

Figure 27:
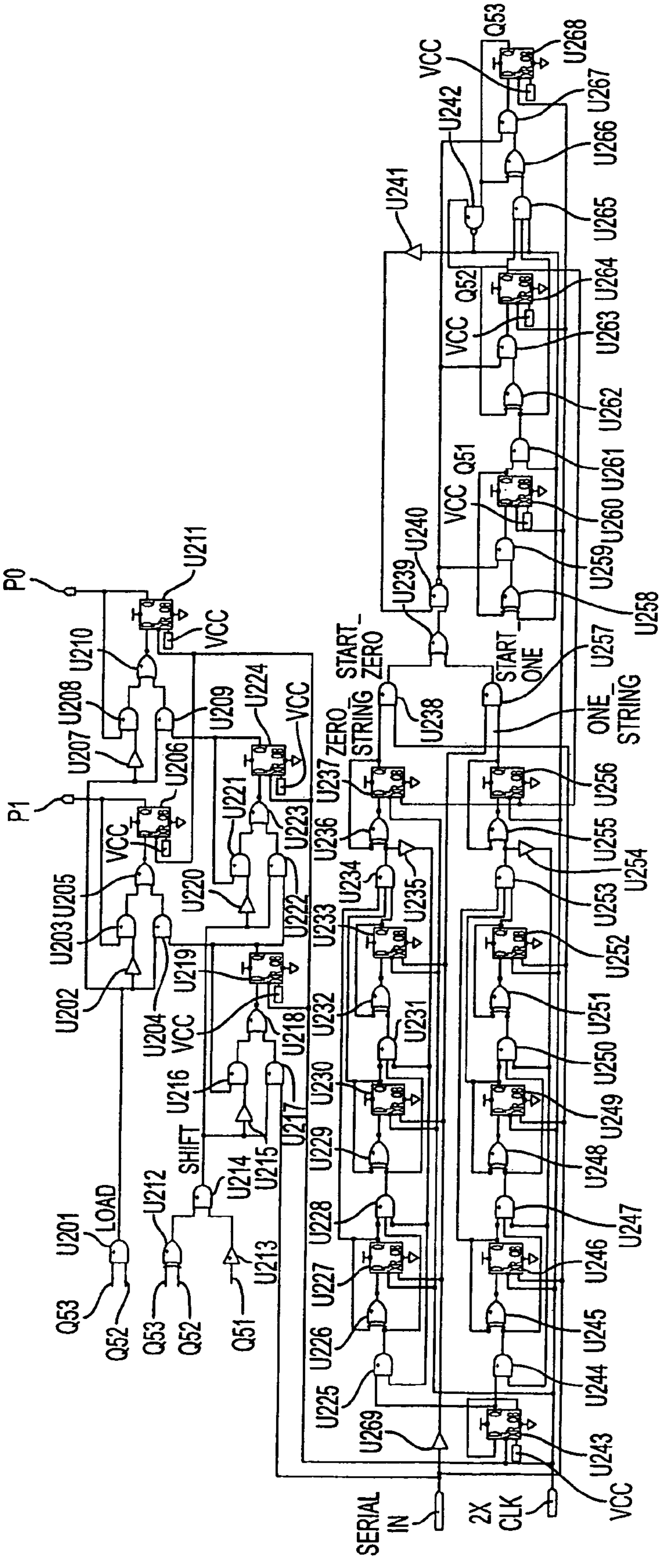
FIG. 27 is an exemplary circuit topology of control logic for a multiple-bit receiver included in the battery charger of FIG. 26.

FIG. 27 is an exemplary circuit topology of control logic for a multiple-bit receiver in battery charger 10, in which a serrated pulse signal including bit packets are decoded. This design is set up for two data bits B0 and B1 in this example. This control logic may comprise flop-flops, AND gates, OR gates, XOR gates and inverters. In more detail, the control logic comprises a consecutive zero detector (U225-U237 and U69), a consecutive one detector (U243-U256), a shift register (U201-U224), a timing generator (U240-U242, U258-U268) for generating load and shift signals for the serial shift register based on detection by consecutive zero detector and consecutive one detector. There is input port SERIAL_IN to receive a serrated pulse signal to be provided to the detectors and shift resistor. The shift register has output ports P1 and P0, from which signals embedded in the serrated pulse signal are reproduced.

When the serrated pulse signal enters input port SERIAL_IN, consecutive zero detector U225-U237 and U269 detect when a large number of consecutive zeroes have occurred on input port SERIAL_IN. When this occurs, node ZERO_STRING (output signal of flip-flop U237) goes high. The first logic one on input port SERIAL_IN after the string of zeros indicates the start of a new bit pattern. When the first logic one appears, node START_ZERO (an output of AND gate U238) becomes high.

In a similar fashion, consecutive one detector U243-U256 detects when a large number of consecutive ones have occurred on input port SERIAL_IN. When this occurs, node ONE_STRING (output of flip-flop U256) goes high. The first logic zero on input port SERIAL_IN after the string of ones indicates the start of a new bit pattern. When the first logic zero appears, node START_ONE (output AND gate U257) becomes high.

An output of OR gate U239, connected to nodes START_ZERO and START_ONE, indicates that a start pulse has occurred in either sequence and is used to trigger timing generator U240-U242 and U258-U268 which controls shift register U201-U224. The shift register comprises synchronous inputs SHIFT and LOAD. Input LOAD is generated by AND gate U201 according to timing signals Q53 and Q52 from flip-flop Q264 and Q268 of the timing generator. Input SHIFT inputs are generated by XOR gate U212, inverter U213 and AND gate U214 based on timing signals Q51-Q53. Timing signal Q51 comes from flip-flop U260. Flop-flops U219 and U224 provide the shift function while flip-flop U206 and U211 prevent outputs P0 and P1 from changing state until flop-flops U219 and U224 have finished shifting in new data. Data bits B0 and B1 can be detected by waiting the correct amount of time after the leading edge of the start bit.

Figure 28:
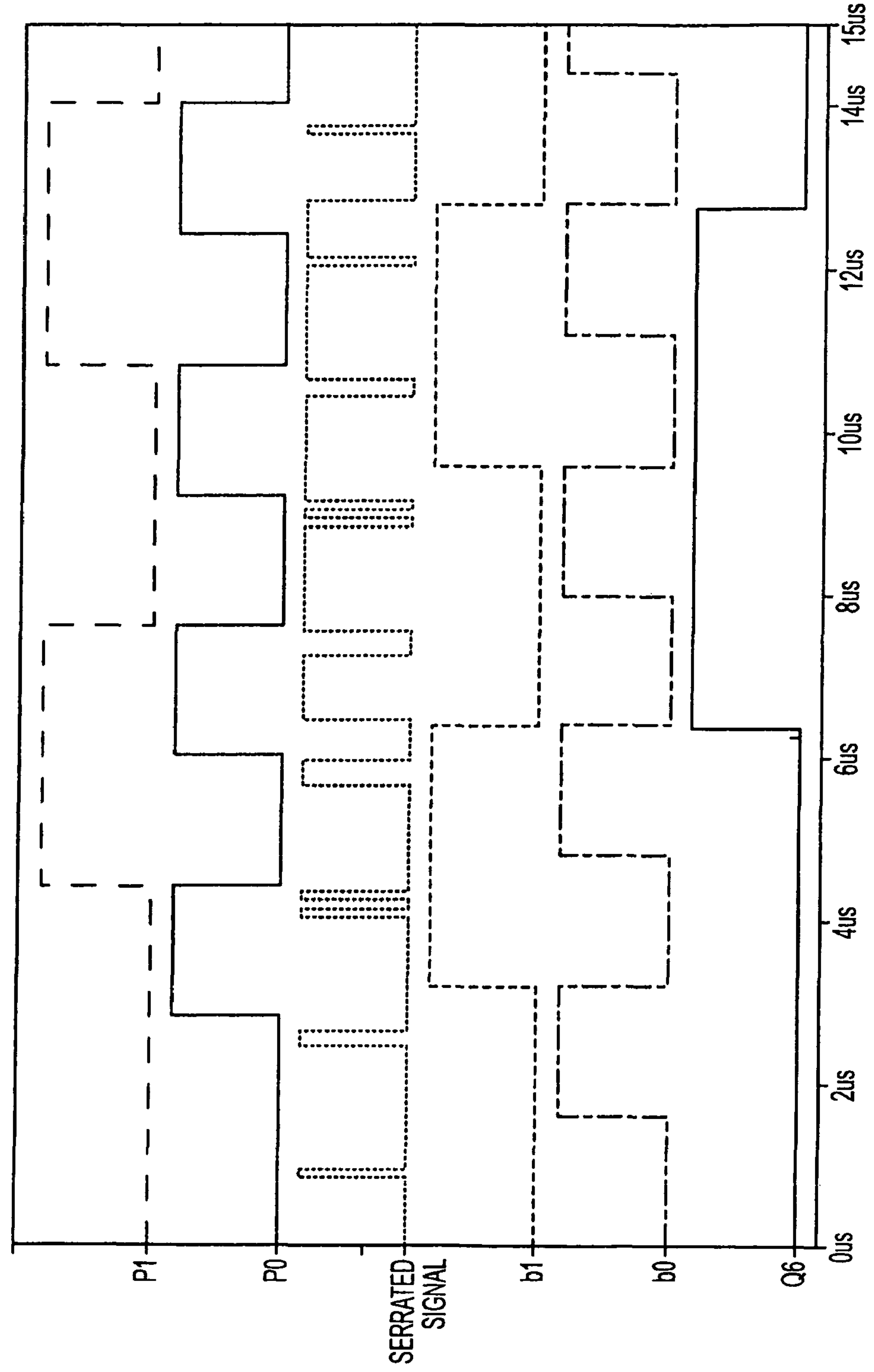
FIG. 28 is exemplary simulated waveforms explaining operation of the control logic shown in FIG. 27.

FIG. 28 shows an exemplary simulated waveforms explaining operation of the control logic shown in FIG. 27. FIG. 28 shows, from the bottom, low frequency signal Q6 (see FIGS. 21-25), original signals b0 and b1 to be embedded in a serrated pulse signal, a serrated pulse signal to be input to input port SERIAL_IN, and output (reproduced) signals P1 and P0 corresponding to signals b0 and b1. All four combinations of signals b0 and b1 are presented to the serrated pulse generator (FIG. 21) producing a serrated pulse signal. The serrated pulse signal comprises a start bit followed by data bits B0 and B1, and stop bits (which are determined by the low frequency component (Q6) of the serrated pulse signal). Shortly after the bits are received, the shift register updates and provides the results to output ports P0 and P1, i.e., outputs signals P0 and P1 to reproduce signal b0 and b0.

Battery charger 10*a* operates based on signals P0 and P1. By sending a serrated signal to battery charger 10*a*, an external processor can change the charger's operation, such as its charging behavior. If battery charger 10*a* has a programmable charge termination, the processor sends a serrated signal to battery charger 10 to change one charge termination method to another. For example, the processor can embed in the serrated signal a bit to change a current charge termination mode, and another bit indicating a new charge termination method. Moreover, the processor can send battery charger 10*a* a serrated signal to test battery charger 10*a*. For example, the serrated signal can specify one of the test modes incorporated in battery charger 10*a*, and testing conditions. Based on the decoded signal, control unit 94 controls operation mode change, conducts self-testing and so on, as described above.

Since the serrated signal can carry more than one instruction, it is suitable for a battery charger having a limited number of pins. It is also possible to drive LED 22 so that a user can recognize change of operation modes of the battery charger. It is noted that person skilled in the art will understand that controller 90 can be implemented by software or a hardwired circuit.

Having described embodiments, it is noted that modifications and variations can be made by person skilled in the art in light of the above teachings. In this disclosure, generation of the serrated pulse train is explained in a digital approach. Alternatively, an analog approach may also be used to produce the serrated pulse train.

It may also possible to replace LED 22 with a speaker to realize audio status indication, instead of visual status indication. This modification can readily be achieved by persons skilled in the art. For example, the blink (alternating) frequency may be varied, an audio amplifier to drive the speaker may be required.

The serrated signal generators discussed in this disclosure can be implemented in any other systems. For example, a refrigerator has a water filter and monitors the filter to notice a user that the filter needs to be replaced. That notice is made by an LED. The serrated signal generator in this disclosure can be applied to a refrigerator. The generator can notify a user that a filter should be replaced by blinking the LED, and notify a computer of the necessity of replacing the filter. In this case, the computer can be configured to order filters online, if necessary.

Furthermore, error codes of any other system can be expressed by serrated signals with status bits. For example, a refrigerator comprises a high speed optical link to which diagnostic equipment can optically be coupled. The diagnostic equipment can receives and decodes the serrated signal with status bits from the refrigerator, and can show what problem the refrigerator has, to a repair person.

It is therefore to be understood that changes may be made in the particular embodiments disclosed that are within the scope and sprit of the disclosure as defined by the appended claims and equivalents.

What is claimed is:

1. Apparatus for producing an output signal indicating an operating status of a monitored circuit, comprising:

an input node for receiving an input signal relating to the monitored circuit;

a pulse train generator coupled to the input node and configured for generating a pulse train of a first prescribed frequency at a duty cycle, the duty cycle being repeatedly alternated between first and second duty cycle values at a second prescribed frequency based on the input signal, the first prescribed frequency being different from the second prescribed frequency, in which the duty cycle and the second prescribed frequency are simultaneously indicative of operating status of the monitored circuit; and an output node to which the pulse train is applied.

2. The apparatus according to claim 1, wherein duty cycle information is adapted to be supplied to a processor, and frequency information of the second prescribed frequency is adapted to be supplied to a user discernible output device.

3. The apparatus according to claim 2, wherein the user discernible output device is a light emitting device.

4. The apparatus according to claim 1, wherein the output node is adapted to be coupled to a processor and a light emitting device, in which the duty cycle conveys status information to the processor, and the second prescribed frequency conveys status information to a user.

5. The apparatus according to claim 4, wherein the first duty cycle value is relatively low such that the light emitting device presents a visual cue of relatively low intensity, and the second duty cycle value is relatively high such that the light emitting device presents a visual cue of relatively high intensity.

6. The apparatus according to claim 5, wherein the first duty cycle value is about 10% or less, and the second duty cycle value is about 90% or more.

7. The apparatus according to claim 5, wherein the second prescribed frequency alternates at a value such that the light emitting device presents a visual cue that alternates visibly between the relatively high and relatively low intensities.

8. The apparatus according to claim 7, wherein the second prescribed frequency is about 10 Hz or less.

9. The apparatus according to claim 1, wherein the first prescribed frequency of the pulse train is out of an audio frequency band.

10. The apparatus according to claim 9, wherein the first prescribed frequency is greater than approximately 20 KHz.

11. The apparatus according to claim 1, wherein the pulse train generator is configured for varying the first and second duty cycle values and the second prescribed frequency based on the operating status of the monitored circuit.

12. The apparatus according to claim 1, wherein the pulse train generator is further configured for generating a bit packet indicating the operating status of the monitored circuit, and embedding the bit packet in the pulse train.

13. The apparatus according to claim 12, wherein the bit packet includes one or more bits.

14. The apparatus according to claim 13, wherein a repetition rate of the bits is out of an audio frequency band.

15. The apparatus according to claim 14, wherein the repetition rate of the bits is greater than approximately 20 KHz.

16. The apparatus according to claim 12, wherein the pulse train generator embeds the bit packet in an interval of pulses in the pulse train.

17. The apparatus according to claim 1, wherein the pulse train generator includes a circuit configured for removing spurious glitches from the pulse train.

18. The apparatus according to claim 1, further comprising:

a decoder for receiving and decoding a pulse train of a prescribed repetition rate at a duty cycle alternated between third and fourth duty cycle values at a prescribed frequency to obtain an instruction, and a controller for controlling the apparatus based on the instruction.

19. The apparatus according to claim 18, wherein the pulse train further includes a bit packet for conveying the instruction.

20. A battery charger for charging a battery, comprising:

a detector detecting an operating status of a battery; and a pulse train generator coupled to the detector and configured for generating a pulse train of a first prescribed frequency at a duty cycle, the duty cycle being repeatedly alternated between first and second duty cycle values at a second prescribed frequency based on the input signal, the first prescribed frequency being different from the second prescribed frequency, in which the duty cycle values and frequency are simultaneously indicative of operating status of the battery; and an output node to which the pulse train is applied.

21. The battery charger according to claim 20, wherein the output node is adapted to be coupled to a processor and a light emitting device, in which the duty cycle conveys status information to the processor, and the second prescribed frequency conveys status information to a user.

22. The battery charger according to claim 21, wherein the first duty cycle value is relatively low such that the light emitting device presents a visual cue of relatively low intensity, and the second duty cycle value is relatively high such that the light emitting device presents a visual cue of relatively high intensity.

23. The battery charger according to claim 22, wherein the first duty cycle value is about 10% or less, and the second duty cycle value is about 90% or more.

24. The battery charger according to claim 22, wherein the second prescribed frequency alternates at a value such that the light emitting device presents a visual cue that alternates visibly between the relatively high and relatively low intensities.

25. The battery charger according to claim 24, wherein the second prescribed frequency is about 10 Hz or less.

26. The battery charger according to claim 20, wherein the first prescribed frequency of the pulse train is out of an audio frequency band.

27. The battery charger according to claim 26, wherein the first prescribed frequency is greater than approximately 20 KHz.

28. The battery charger according to claim 20, wherein the pulse train generator is configured for varying the first and second duty cycle values and the second prescribed frequency based on the operating status of the monitored circuit.

29. The battery charger according to claim 20, wherein the detector is configured to detect whether the battery is being charged or not, and whether the battery is in a prescribed condition, and the pulse train generator generates the pulse train in response to the prescribed condition.

30. The battery charger according to claim 29, wherein the prescribed condition includes whether the battery is defective and whether the battery is in an out of temperature range, and the pulse train generator varies the first and second duty cycle values and the second prescribed frequency based on the condition detected.

31. The battery charger according to claim 20, wherein the pulse train generator is further configured for generating a bit packet indicating the operating status of the monitored circuit, and embedding the bit packet in the pulse train.

32. The battery charger according to claim 31, wherein the bit packet includes one or more bits.

33. The battery charger according to claim 32, wherein a repetition rate of the bits is out of an audio frequency band.

34. The battery charger according to claim 33, wherein the repetition rate of the bits is greater than approximately 20 KHz.

35. The battery charger according to claim 31, wherein the pulse train generator embeds the bit packet in an interval of pulses in the pulse train.

36. The battery charger according to claim 20, wherein the pulse train generator includes a circuit configured for removing spurious glitches from the pulse train.

37. The battery charger according to claim 20, further comprising:

a decoder for receiving and decoding a pulse train of a prescribed repetition rate at a duty cycle alternated between third and fourth duty cycle values at a prescribed frequency to obtain an instruction, and a controller for controlling the apparatus based on the instruction.

38. The battery charger according to claim 37, wherein the pulse train includes a bit packet for conveying the instruction.

39. A method for producing status information relating to a monitored circuit, comprising the steps of:

receiving an input signal relating to the monitored circuit; and generating a pulse train of a first prescribed frequency at a duty cycle, the duty cycle being repeatedly alternated between first and second duty cycle values at a second prescribed frequency based on the input signal, the first prescribed frequency being different from the second prescribed frequency, in which the duty cycle values and the second prescribed frequency are simultaneously indicative of operating status of the monitored circuit.

40. The method according to claim 39, further comprising the step of outputting the pulse train to a processor and a user discernible output device, in which the duty cycle conveys the status information to the processor, and the second prescribed frequency conveys the status information to a user through the user discernible output device.

41. The method according to claim 39, wherein the pulse train generating step includes generating a bit packet indicating the operating status of the monitored circuit, and embedding the bit packet in the pulse train.

42. The apparatus according to claim 12, wherein the first duty cycle value is smaller than the second duty cycle value, and each pulse having the first duty cycle value in the pulse train is the bit packet.

43. The apparatus according to claim 12, wherein the first duty cycle value is smaller than the second duty cycle value, and the bit packet is embedded between pulses having the second duty cycle in the pulse train.

44. The battery charger according to claim 31, wherein the first duty cycle value is smaller than the second duty cycle value, and each pulse having the first duty cycle value in the pulse train is the bit packet.

45. The battery charger according to claim 31, wherein the first duty cycle value is smaller than the second duty cycle value, and the bit packet is embedded between pulses having the second duty cycle in the pulse train.

46. The method according to claim 41, wherein the first duty cycle value is smaller than the second duty cycle value, and each pulse having the first duty cycle value in the pulse train is the bit packet.

47. The method according to claim 41, wherein the first duty cycle value is smaller than the second duty cycle value, and the bit packet is embedded between pulses having the second duty cycle in the pulse train.

* * * * *